US011533414B2

(12) United States Patent
Steffanson et al.

(10) Patent No.: US 11,533,414 B2
(45) Date of Patent: *Dec. 20, 2022

(54) IMAGING APPARATUSES AND ENCLOSURES

(71) Applicant: MP High Tech Solutions Pty Ltd, Eveleigh (AU)

(72) Inventors: Marek Steffanson, Mosman (AU); Mark Halstead, Auckland (NZ); Donald James Bone, Wentworth Falls (AU)

(73) Assignee: Calumino Pty Ltd., Eveleigh (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,032

(22) Filed: Jun. 4, 2021

(65) Prior Publication Data

US 2021/0297561 A1 Sep. 23, 2021

Related U.S. Application Data

(63) Continuation of application No. 16/742,436, filed on Jan. 14, 2020, now Pat. No. 11,032,451, which is a
(Continued)

(51) Int. Cl.
*H04N 5/225* (2006.01)
*H04N 7/18* (2006.01)
*H04N 5/33* (2006.01)

(52) U.S. Cl.
CPC ......... *H04N 5/2252* (2013.01); *H04N 5/2253* (2013.01); *H04N 5/33* (2013.01);
(Continued)

(58) Field of Classification Search
CPC ...... H04N 5/2252; H04N 5/2253; H04N 5/33; H04N 7/181; H04N 7/183; H04N 7/185
See application file for complete search history.

(56) References Cited

U.S. PATENT DOCUMENTS 2,344,302 A 3/1944 Harza
2,800,577 A 7/1957 Block
(Continued)

FOREIGN PATENT DOCUMENTS

CN 201706162 1/2011
CN 201706162 U 1/2011
(Continued)

OTHER PUBLICATIONS

Imaging Apparatuses and Enclosures, U.S. Appl. No. 15/643,059, filed Jul. 6, 2017, Marek Steffanson et al., Patented Case, Jul. 1, 2019.
(Continued)

*Primary Examiner* — Fernando Alcon
(74) *Attorney, Agent, or Firm* — Greenberg Traurig

(57) ABSTRACT

An enclosure having: a base face that is opaque or translucent to human eyes viewing from outside of the enclosure and transparent to infrared radiation; and at least two flat, orthogonal mounting faces configured to be overlaid respectively on at least two surfaces of walls and ceiling of a room. A thermal imaging apparatus configured to image based on infrared radiation and mounted within the enclosure with a predetermined orientation relative to the base face to have a designed imaging direction with respect to the room when the enclosure is mounted in the room to have the at least two orthogonal mounting faces overlaid respectively on the at least two surfaces.

22 Claims, 10 Drawing Sheets

Related U.S. Application Data continuation of application No. 15/643,059, filed on Jul. 6, 2017, now Pat. No. 10,582,095.

(60) Provisional application No. 62/408,615, filed on Oct. 14, 2016.

(52) U.S. Cl.
CPC ............. *H04N 7/181* (2013.01); *H04N 7/183* (2013.01); *H04N 7/185* (2013.01)

(56) References Cited

U.S. PATENT DOCUMENTS

| | | |
|---|---|---|
| 3,289,557 A | 12/1966 | Thomas et al. |
| 3,456,446 A | 7/1969 | Kusatake |
| 3,593,994 A | 7/1971 | Anbar |
| 3,606,065 A | 9/1971 | Carlson |
| 3,986,007 A | 10/1976 | Ruoff, Jr. |
| 4,217,629 A | 8/1980 | Russell |
| 4,381,144 A | 4/1983 | Breslau |
| 4,684,124 A | 8/1987 | Escher |
| 4,787,630 A | 11/1988 | Watson et al. |
| 4,862,333 A | 8/1989 | Brasket |
| 4,942,071 A | 7/1990 | Frye |
| 4,972,633 A | 11/1990 | Wright |
| 5,062,629 A | 11/1991 | Vaughan |
| 5,080,526 A | 1/1992 | Waters |
| 5,147,265 A | 9/1992 | Pauls et al. |
| 5,249,966 A | 10/1993 | Hiigli |
| 5,349,134 A | 9/1994 | Russell |
| D354,973 S | 1/1995 | Hisatune |
| 5,456,277 A | 10/1995 | Pontius, Jr. |
| 5,511,740 A | 4/1996 | Loubert et al. |
| 5,683,337 A | 11/1997 | Zetocha et al. |
| D403,340 S | 12/1998 | Arbuckle |
| 5,908,265 A | 6/1999 | Mostkoff |
| D414,504 S | 9/1999 | Madden |
| 6,172,665 B1 | 1/2001 | Bullister |
| 6,287,655 B1 | 9/2001 | Nichols, Jr. |
| 6,385,772 B1 | 5/2002 | Courtney |
| 6,634,804 B1 | 10/2003 | Toste et al. |
| D486,173 S | 2/2004 | Toste et al. |
| 6,824,318 B2 | 11/2004 | Toste et al. |
| D503,183 S | 3/2005 | Arbuckle et al. |
| D504,315 S | 4/2005 | Lee |
| 6,912,007 B2 | 6/2005 | Gin |
| D515,124 S | 2/2006 | Bleau et al. |
| 7,226,027 B1 | 6/2007 | Feeley |
| D552,651 S | 10/2007 | Arbuckle |
| D558,811 S | 1/2008 | Higgins et al. |
| D564,003 S | 3/2008 | Throckmorton et al. |
| D586,834 S | 2/2009 | Andrews |
| 7,599,000 B2 | 10/2009 | Lai |
| D606,572 S | 12/2009 | Samson et al. |
| D607,033 S | 12/2009 | Arbuckle |
| 7,627,235 B2 | 12/2009 | McCutchen et al. |
| D610,183 S | 2/2010 | Nohavec et al. |
| 7,835,634 B2 | 11/2010 | Berend et al. |
| 7,874,744 B2 | 1/2011 | Cirker |
| 8,137,009 B2 | 3/2012 | Cirker |
| D667,038 S | 9/2012 | Goddard et al. |
| 8,317,414 B2 | 11/2012 | Jones |
| 8,641,144 B2 | 2/2014 | Davis, Jr. et al. |
| 8,708,582 B2 | 4/2014 | Gagnon et al. |
| D711,956 S | 8/2014 | Adams |
| 8,824,884 B1 | 9/2014 | Trujillo |
| D717,288 S | 11/2014 | Adams |
| 8,903,317 B2 | 12/2014 | Wu |
| D729,299 S | 5/2015 | Adams |
| D732,598 S | 6/2015 | Adams |
| 9,182,653 B2 | 11/2015 | Heilweil et al. |
| D744,570 S | 12/2015 | Criscuolo et al. |
| D752,126 S | 3/2016 | Heilweil et al. |
| 9,306,604 B2 | 4/2016 | Jurawan |
| 9,341,586 B2 | 5/2016 | Henderkott et al. |
| 9,591,215 B1 | 3/2017 | Miller et al. |
| 9,615,725 B2 | 4/2017 | Deng et al. |
| 9,723,693 B1 | 8/2017 | Megginson et al. |
| 9,968,820 B2 | 5/2018 | Stockhausen |
| 10,582,095 B2 | 3/2020 | Steffanson et al. |
| 11,032,451 B2 | 6/2021 | Steffanson et al. |
| 2001/0022627 A1 | 9/2001 | Bernhardt |
| 2001/0027661 A1 | 10/2001 | Nishikawa et al. |
| 2003/0169522 A1 | 9/2003 | Schofield et al. |
| 2003/0210346 A1 | 11/2003 | Hildreth |
| 2004/0012715 A1 | 1/2004 | Gin |
| 2006/0028548 A1 | 2/2006 | Salivar et al. |
| 2006/0046901 A1 | 3/2006 | Pan et al. |
| 2011/0228087 A1 | 9/2011 | Hsieh |
| 2012/0224052 A1 | 9/2012 | Bae |
| 2012/0225741 A1 | 9/2012 | Antolick |
| 2013/0016203 A1 | 1/2013 | Saylor et al. |
| 2013/0155230 A1 | 6/2013 | Boketoft et al. |
| 2013/0163879 A1 | 6/2013 | Katz et al. |
| 2013/0169801 A1 | 7/2013 | Martin et al. |
| 2013/0182121 A1 | 7/2013 | Huppertz et al. |
| 2014/0118557 A1 | 5/2014 | Lee et al. |
| 2014/0267596 A1 | 9/2014 | Geerds |
| 2014/0293043 A1 | 10/2014 | Datta et al. |
| 2015/0031319 A1 | 1/2015 | Jurawan |
| 2015/0070575 A1 | 3/2015 | Lee et al. |
| 2015/0288868 A1 | 10/2015 | Slavin et al. |
| 2015/0288878 A1 | 10/2015 | Bae et al. |
| 2015/0377711 A1 | 12/2015 | Steffanson et al. |
| 2016/0203611 A1 | 7/2016 | Datta et al. |
| 2016/0236626 A1 | 8/2016 | Yialamas |
| 2016/0350587 A1 | 12/2016 | Bataller et al. |
| 2016/0350596 A1 | 12/2016 | Bataller et al. |
| 2016/0350597 A1 | 12/2016 | Bataller et al. |
| 2016/0350599 A1 | 12/2016 | Bataller et al. |
| 2016/0350921 A1 | 12/2016 | Bataller et al. |
| 2017/0228892 A1 | 8/2017 | Nichol et al. |
| 2018/0091569 A1 | 3/2018 | Roth et al. |
| 2018/0109703 A1 | 4/2018 | Steffanson et al. |
| 2018/0165930 A1 | 6/2018 | Hertzman et al. |
| 2018/0293443 A1 | 10/2018 | Bataller et al. |
| 2018/0341816 A1 | 11/2018 | Steffanson et al. |
| 2018/0341817 A1 | 11/2018 | Steffanson et al. |
| 2018/0341818 A1 | 11/2018 | Steffanson et al. |
| 2018/0349707 A1 | 12/2018 | Bataller et al. |
| 2020/0154006 A1 | 5/2020 | Steffanson et al. |

FOREIGN PATENT DOCUMENTS

| | | | |
|---|---|---|---|
| CN | 106264537 A | 1/2017 | |
| EP | 3179149 A1 * | 6/2017 | ........... F16M 11/041 |
| JP | H07203261 | 8/1995 | |
| JP | H08136251 | 5/1996 | |
| JP | 2001238101 A | 8/2001 | |
| JP | 2005233846 | 9/2005 | |
| JP | 2013134186 | 12/2011 | |
| JP | 2013025789 | 2/2013 | |
| WO | 2013078601 | 6/2013 | |
| WO | WO-2013078601 A * | 6/2013 | ........... H04N 5/2252 |

OTHER PUBLICATIONS

Imaging Apparatuses and Enclosures, U.S. Appl. No. 16/742,436, filed Jan. 14, 2020, Marek Steffanson et al., Patented Case, Oct. 26, 2020.

Apparatus and Method of Location Determination in a Thermal Imaging System, U.S. Appl. No. 15/607,345, filed May 26, 2017, Marek Steffanson et al., Final Rejection dated Apr. 7, 2021.

Apparatus and Method of Location Determination in a Thermal Imaging System, U.S. Appl. No. 15/797,693, filed Oct. 30, 2017, Marek Steffanson et al., Non Final Action dated Apr. 12, 2021.

Apparatus and Method of Location Determination in a Thermal Imaging System, U.S. Appl. No. 15/797,999, filed Oct. 30, 2017, Marek Steffanson et al., Non Final Action dated Apr. 7, 2021.

Camera Enclosure, U.S. Appl. No. 29/604,436, filed May 17, 2017, Marek Steffanson, Non Final Action dated Feb. 26, 2021.

(56) References Cited

OTHER PUBLICATIONS

Extended European Search Reportion, EP 17910826.1, dated Dec. 22, 2020.
International Patent Application No. PCT/US17/49763, International Search Report and Written Opinion, dated Feb. 21, 2018.
New Wire-Free, Smart Home Monitoring System Lets You "Blink, & You're Home", http://bostinno.streetwise.co/2014/07/21/blink-kickstarter-smart-home-battery-powered-hd-video-camera-and-motion-detector/, retrived Jul. 6, 2017.
Wikipedia, One-way mirror, retrieved Oct. 4, 2016.

* cited by examiner

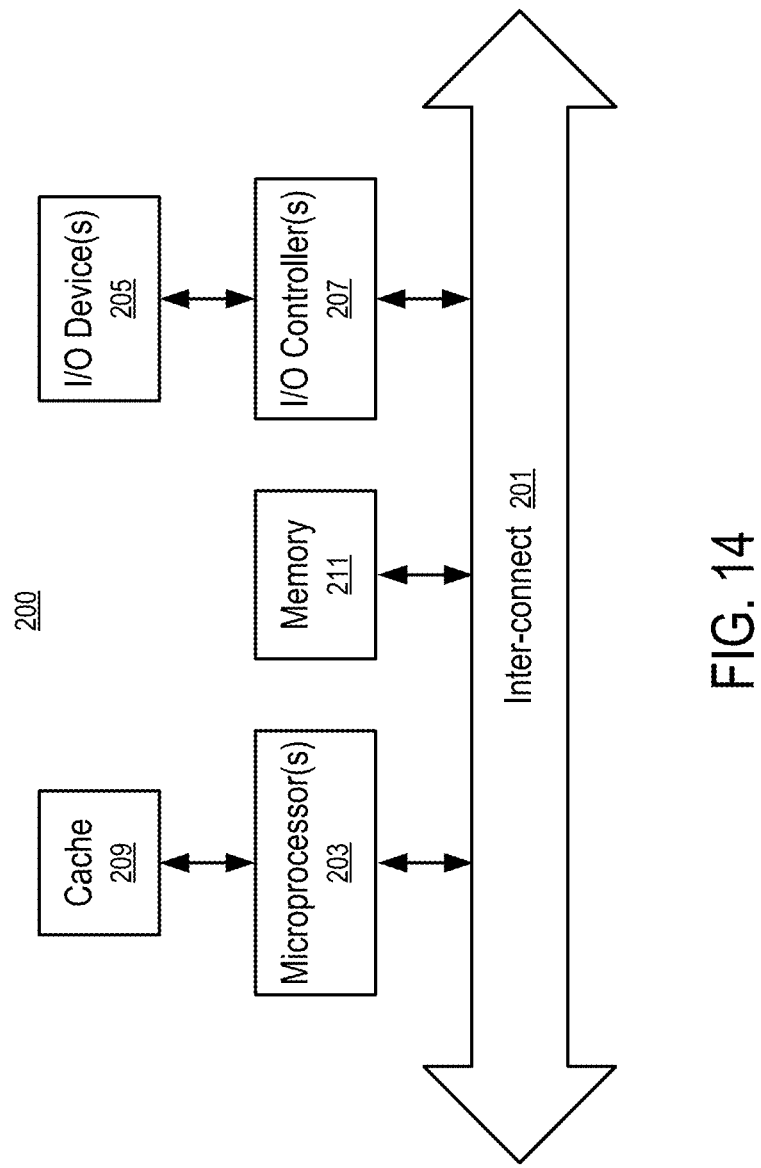

IMAGING APPARATUSES AND ENCLOSURES

RELATED APPLICATIONS

The present application is a continuation application of U.S. patent application Ser. No. 16/742,436, filed Jan. 14, 2020, issued as U.S. Pat. No. 11,032,451 on Jun. 8, 2021, which is a continuation application of U.S. patent application Ser. No. 15/643,059, filed Jul. 6, 2017, issued as U.S. Pat. No. 10,582,095 on Mar. 3, 2020, which claims the benefit of Prov. U.S. patent application Ser. No. 62/408,615, filed Oct. 14, 2016, all entitled "Imaging Apparatuses with Enclosures", the entire disclosures of which applications are hereby incorporated herein by reference.

The present application relates to U.S. patent application Ser. No. 15/607,345, filed May 26, 2017 and entitled "Apparatus and Method of Location Determination in a Thermal Imaging System", U.S. patent application Ser. No. 29/604,436, filed May 17, 2017 and entitled "Camera Enclosure", U.S. patent application Ser. No. 14/750,403, filed Jun. 25, 2015, published as U.S. Pat. App. Pub. No. 2015/0377711, and entitled "Apparatus and Method for Electromagnetic Radiation Sensing", U.S. patent application Ser. No. 14/788,286, filed Jun. 30, 2015, and entitled "Micromechanical Device for Electromagnetic Radiation Sensing", U.S. patent application Ser. No. 14/810,363, filed Jul. 27, 2015, and entitled "Micromechanical Device for Electromagnetic Radiation Sensing", and U.S. patent application Ser. No. 15/188,116, filed Jun. 21, 2016, and entitled "Fabrication Method for Micromechanical Sensors", the entire disclosure of which applications are hereby incorporated herein by reference.

FIELD OF THE TECHNOLOGY

At least some embodiments disclosed herein relate, in general, to imaging apparatuses for monitoring, recording or imaging a space enclosed by walls and a floor (e.g., a room) to improve security, safety, energy usage, and to detect human occupancy and/or their activities, and more specific, to methods and apparatuses for setting up the orientation of the imaging apparatuses (e.g., for thermal imaging).

BACKGROUND

A common method for monitoring a room for events and regions of interest is to mount within the room an imaging apparatus capable of detecting the events or regions. The imaging apparatus may include a camera, a structured light source or similar apparatus, or some combinations of such devices. Preferably, the imaging apparatus is mounted in a position and orientation that allows it to detect events in a required region of interest, which may approach full room coverage.

A variety of methods, assemblies and apparatuses exist for the alignment and installation of an imaging apparatus within a room. One method is simply to set up an imaging apparatus, such as an IP camera in a room and adjust it manually with the feedback of a monitoring device to capture a relevant region within a room, which has the disadvantage that some alignment tool, such as a display is required.

U.S. Pat. No. 6,912,007 discloses a securable corner mounted surveillance unit with dual windows which is suited for a secured placement in an upper corner of a room, including a closed circuit surveillance camera unit. U.S. Pat. App. Pub. No. 2013/0155230 discloses a method for the tilt and rotation of a camera to achieve desired alignment. Such methods and apparatus have the disadvantage that the installer may be required to use some sort of elevation tool, such as a ladder or stool to reach the designated area for the installation of the apparatus. Further some technical tools, such as screwdrivers, drills, etc. are required to secure the apparatuses accordingly and correctly and to attach or install the power supply wires for the surveillance camera. Manual or electric adjustments may be required for the monitoring device to capture the designated region.

U.S. Pat. No. 7,226,027 discloses a rear mounting member for receipt of an insertion member, which requires an assembly of a shell, which again requires for the installer to use some technical tools and to have the knowledge and skills to use such tools.

U.S. Pat. App. Pub. No. 2015/0377711, entitled "Apparatus and Method for Electromagnetic Radiation Sensing", discloses an apparatus for thermal imaging based on infrared (IR) radiation. Such an apparatus can be used for human detection, fire detection, gas detection, temperature measurements, environmental monitoring, energy saving, behavior analysis, surveillance, information gathering and for human-machine interfaces. Such an apparatus and/or other similar apparatuses can be used in embodiments of inventions disclosed in the present application. The entire disclosure of U.S. Pat. App. Pub. No. 2015/0377711 is hereby incorporated herein by reference.

BRIEF DESCRIPTION OF THE DRAWINGS

The embodiments are illustrated by way of example and not limitation in the figures of the accompanying drawings in which like references indicate similar elements.

FIG. 14 shows a data processing system that can be used to implement some components of embodiments of the present application.

DETAILED DESCRIPTION

Figure 1:
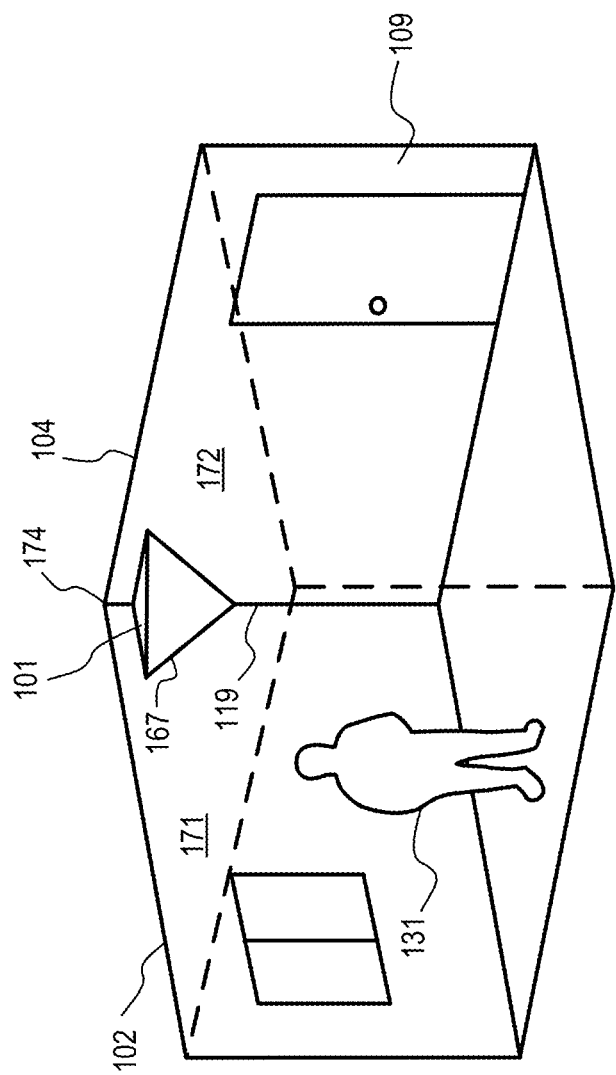
FIG. 1 illustrates an imaging apparatus having an enclosure adapted for simplifying its installation in a room.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In one aspect, conventional methods to install an imaging apparatus in a room to monitor a region of interest within the room exhibit one or more of problems or drawbacks.

For example, the mounting of the imaging apparatus may be difficult to perform using existing methods, assemblies and apparatuses, which may require a person with technical skills and tools to properly install the imaging apparatus in the room.

For example, a person with technical skills and tools may be required to achieve the mounting position and orientation necessary to cover the required region of interest. For the alignment of the orientation of the imaging apparatus with respect to the region of interest, an installer may require a specialized monitoring device to display the image recorded by the imaging apparatus such that based on the display on the specialized monitoring device, the installer adjusts the orientation of the imaging device to achieve the alignment.

Further, the installer may be required to have some technical skills in order to align the imaging apparatus accordingly within the desired orientation. For example, a slight change in the position and orientation of the imaging apparatus typically can result in a significant change of the field of view of the imaging apparatus; and as a result, an installer may be required to have a steady hand and the ability to adjust the position and/or orientation of an imaging apparatus finely, which can be challenging for seniors or people with disabilities.

In the present disclosure, the imaging apparatus is configured to be housed in an enclosure that has mounting surfaces adapted to simplify the installation of the imaging apparatus for proper alignment with the field to be monitored by the imaging apparatus.

In another aspect, there are concerns associated with the installation of an imaging device in a room.

For example, observing an imaging apparatus mounted in a room may cause a privacy intrusion concern among occupants who notice the imaging apparatus pointing towards them or the area where they are standing.

Being monitored is a concern and people are likely to behave differently when they are aware that they are being recorded, monitored or imaged with a visually noticeable imaging apparatus. Further, being monitored within rooms may be restricted by privacy laws.

However, monitoring a room using, for example, a low-resolution thermal camera will disallow the identification of individuals due to the lack of recorded and/or imaged detail. A low-resolution thermal camera or thermal sensor can detect humans by their elevated body temperature but lacks the spatial detail to make assumptions of the subject's identity. Such a low-resolution thermal camera may have the appearance of an imaging device or lens; and the sight of such lens or imaging devices by a subject within the imaged region may be bothersome.

In the present disclosure, the imaging apparatus is configured to be optionally hidden behind a visually non-transparent, but thermal radiation transparent material, which arrangement provides a solution to avoid privacy concerns of monitored subjects, while the subjects are only monitored for their detection and not identification.

In other aspects, installation of an imaging apparatus in a room may require a separate installation of cables for the power supply and/or data transmission of the recorded footage. Wireless apparatuses typically have a very limited operational time due to the relatively large data volumes to be wirelessly transmitted from visual monitoring with a low, standard or high definition camera. Typically, cameras require a resolution of above 320×240 pixels for good recognition of the monitored area and typically run at more than 1 frame per second.

The present disclosure provides solutions to simplify installation and alignment via an enclosure (167) of the imaging apparatus and hide the imaging apparatus within the enclosure (167), as illustrated in FIG. 1.

FIG. 1 illustrates an imaging apparatus having an enclosure adapted for simplifying its installation in a room.

In FIG. 1, an imaging apparatus assembly (101) has an enclosure (167) that is configured with a particular geometry, and designed to carry an imaging apparatus (e.g., 175 illustrated in FIG. 5) which is fixed to and specifically aligned with respect to the enclosure (167) such that when the enclosure (167) is attached to surfaces of a room (109) (e.g., walls (171, 172) and/or ceiling), the imaging apparatus (175) is in a preferred orientation with respect to the room for monitoring.

Preferably, the enclosure (167) of the imaging apparatus assembly (101) is such configured that the imaging apparatus (175) enclosed therein is not visible to a person (131) within the capturing field of the imaging apparatus (175).

Preferably, the imaging devices as discussed in U.S. patent application Ser. No. 14/750,403, filed Jun. 25, 2015, published as U.S. Pat. App. Pub. No. 2015/0377711, and entitled "Apparatus and Method for Electromagnetic Radiation Sensing", U.S. patent application Ser. No. 14/788,286, filed Jun. 30, 2015, and entitled "Micromechanical Device for Electromagnetic Radiation Sensing", U.S. patent application Ser. No. 14/810,363, filed Jul. 27, 2015, and entitled "Micromechanical Device for Electromagnetic Radiation Sensing", and/or U.S. patent application Ser. No. 15/188,116, filed Jun. 21, 2016, and entitled "Fabrication Method for Micromechanical Sensors" are used as the imaging apparatus (175) mounted inside the enclosure (167) of the imaging apparatus assembly (101). However, other imaging devices can also be used.

The imaging apparatus (175) disposed within the enclosure (167) may be, for example, a low-resolution thermal imaging apparatus having, for example, 30×20 thermal infrared pixels to capture the scenery with a low frame rate (e.g. 1 frame per second, no more than 9 frames per second) and transmitting such imagery wirelessly to a remote receiving unit, while the enclosed, and thus not visible, low-resolution thermal imaging unit and the transmitting unit are powered by a battery unit enclosed within the enclosure (167).

For example, the imaging apparatus assembly (101) mounted in a room (109) can be connected to a server (113) and/or a mobile device (117) to form a thermal imaging system illustrated in FIG. 11 and discussed further below.

In FIG. 1, the enclosure (167) has a geometry adapted to simplify the process of aligning the orientation of the imaging apparatus assembly (101) with the horizontal direction and the vertical direction of the room (109), as further illustrated in connection with FIG. 2. The room (109) has a vertical edge (119) where two walls (171, 172) meet, a horizontal edge (102 or 104) where a wall (171 or 172) meets the ceiling of the room. The horizontal edges (102 and 104) and the vertical edge (119) meet each other at a ceiling corner (174) of the room (109). The enclosure (167) has mounting faces adapted to simplify the alignment of the orientation of the enclosure (167) with the horizontal and vertical directions of the room (109).

Figure 2:
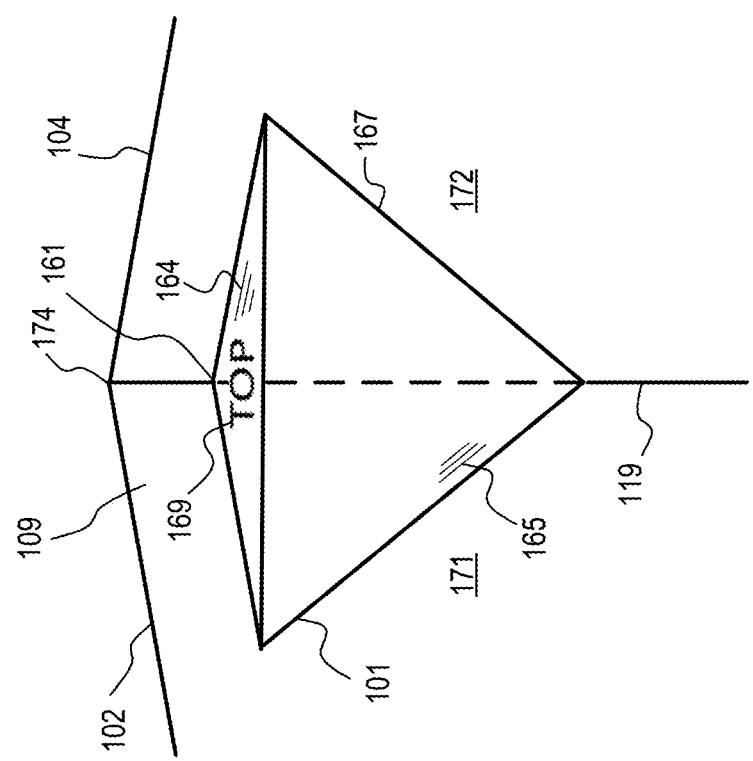
FIG. 2 shows an imaging apparatus assembly having an enclosure mounted on an edge of two orthogonal walls.

FIG. 2 shows an imaging apparatus assembly having an enclosure (167) mounted on an edge (119) of two orthogonal walls (171 and 172). The enclosure (167) has a base face (165) and a top face (164).

Figure 3:
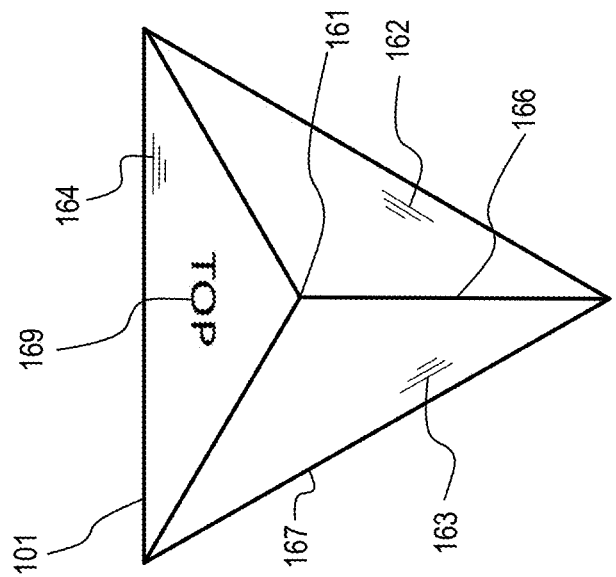
FIG. 3 shows a back top-down view of the enclosure illustrated in FIG. 2.

FIG. 3 shows a back top-down view of the enclosure (167) illustrated in FIG. 2, where a vertical back edge (166) of the enclosure is where the vertical mounting faces (162 and 163) meet, and a vertex (161) is suitable for alignment with the ceiling corner (174).

Figure 5:
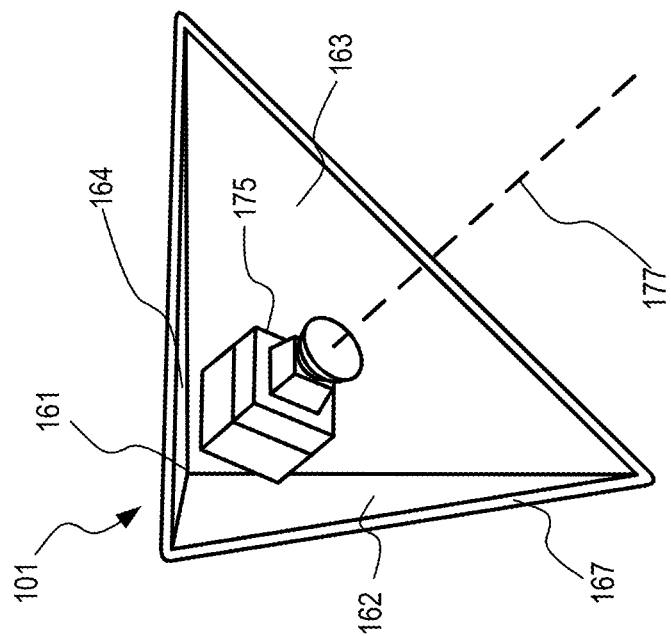
FIG. 5 illustrates an imaging apparatus assembly with the base face of the enclosure being removed.

FIG. 5 illustrates an imaging apparatus assembly (101) of FIG. 2 with the base face (165) of the enclosure (167) being removed (or made transparent) to reveal the imaging apparatus (175) and its optical axis (177).

In FIG. 2, the enclosure (167) of the imaging apparatus assembly (101) is designed to enclose and carry an imaging apparatus (175), such as a thermal camera for imaging based on infrared radiation, and/or other components of the imaging apparatus assembly (101). The imaging apparatus (175) is fixed to and aligned with respect to the directions/orientations of the enclosure (167) of the imaging apparatus assembly (101), such that when the directions of the enclosure (167) are aligned with the directions of the room (109), the imaging apparatus (175) has a known orientation with respect to the directions of the room (109).

The enclosure (167) of the imaging apparatus assembly (101) has at least two orthogonal mounting surfaces (162) and (163) illustrated in FIG. 3. The mounting surfaces (162 and 163) may be perfectly orthogonal to each other or substantially orthogonal to each other (e.g., having an angle of between 85 to 95 degrees, or 88 to 92 degrees).

It is assumed that the walls (171 and 172) of the room (109) are two vertical planes in the room (109), the floor (e.g., 127 illustrated in FIGS. 10 and 11) and the ceiling (e.g., 173 illustrated in FIGS. 8, 9 and 10) of the room (109) are two horizontal planes in the room (109), the edge (119) where the walls (171 and 172) meet is in the vertical direction of the room (109) and is perpendicular to the floor (127) and the ceiling (173) of the room (109), and the edge (102 or 104) where a wall (171 or 172) and the ceiling (173) meet is in a horizontal direction.

Thus, when the imaging apparatus assembly (101) is pushed against an edge (119) where two walls (171 and 172) meet, the mounting surfaces (162 and 163) align with the walls (171 and 172) respectively, which guides the imaging apparatus assembly (101) into an orientation that is aligned with the directions of the room (109), where the mounting surfaces (162 and 163) are in parallel with the walls (171 and 172) respectively, the back edge (166) of the imaging apparatus assembly (101) is in parallel with the edge (119) where the walls (171 and 172) meet and in parallel with the vertical direction of the room (109), the top surface (164) of the imaging apparatus assembly (101) is in parallel with a horizontal plane of the room (e.g., the floor (127) and/or the ceiling (173)), the optical axis (177) of the imaging apparatus (175) has a predetermined direction with respect to the mounting surfaces (162 and 163) and the walls (171 and 172), and the optical axis (177) of imaging apparatus (175) is in a vertical plane in the room and has a predetermined direction with respect to the vertical direction of the room (109). Similarly, the enclosure (167) can be pushed against the ceiling corner (174) for installation at the ceiling corner (174), or pushed against a horizontal edge (102 or 104) for installation at the horizontal edge (102 or 104) of the room (109).

The top surface (164) can also be optionally configured as a mounting surface with one or more attachment elements (e.g. adhesive elements). Thus, the imaging apparatus assembly (101) may be pushed against an edge (102 or 104) where a wall (e.g., 171 or 172) and the ceiling (173) meet, or pushed against a corner (174) where two walls (171 and 172) and the ceiling (173) meet. The alignment of the orientation of the imaging apparatus assembly (101) with the directions of the room (109) can be easily achieved via pushing the imaging apparatus assembly (101) against the edge (119, 102, or 104) or corner (174) where the imaging apparatus assembly (101) is mounted.

FIGS. 2 and 3 illustrate an example of marking the top surface (164) with an orientation indicator (169), which can be used to avoid installing the imaging apparatus assembly (101) sideways where the top surface (164) is mistakenly pressed against a wall (171 or 172).

Figure 4:
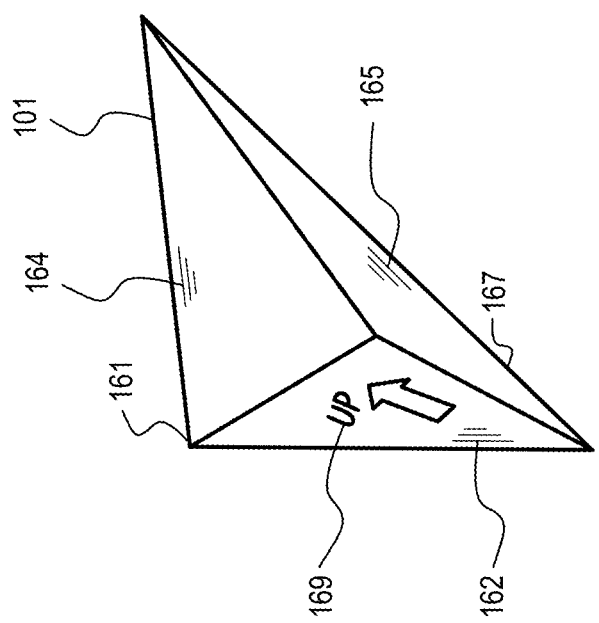
FIG. 4 shows an imaging apparatus assembly having an alternative orientation mark.

FIG. 4 shows an imaging apparatus assembly (101) having an alternative orientation marker (169) that is on a side face (162) of the enclosure (167) of the imaging apparatus assembly (101). The orientation marker (169) includes an arrow pointing up and the letters "UP" for clarifying the intended mounting orientation of the imaging apparatus assembly (101) along the vertical edge (119) of the room (109).

In FIGS. 2 and 3, the orientation marker (169) contained the letter "TOP" to indicate, as a mounting instruction, that the surface (164) is the top-surface for mounting the imaging apparatus assembly (101).

In general, the orientation marker (169) may be a graphical indication of the intended mounting orientation (e.g., arrow) with or without letters or numbers as installation instructions. For example, the bottom indication can be marked with feet or shoes, and the top indication can be marked with a light bulb, sun, cloud, roof, ceiling or any symbol which intuitively indicates the correct mounting position.

Preferably, at least one of the mounting surfaces (162, 163, and/or 164) has an attachment element (e.g. adhesive element) to simplify the process of installing the imaging apparatus assembly (101). For example, the attachment element may be a double sided adhesive film, which requires simply a protective layer to be peeled off by the installer and the enclosure (167) to be brought into contact with a wall. The adhesive film provides a sufficient bond such that no further tools are required for the installation and alignment of enclosure (167) of the imaging apparatus assembly (101). Alternatively, attachment can be achieved via nail, bolt, screw, hole for a wall mounted hook, etc.

The orthogonal mounting faces (162 and 163) illustrated in FIG. 3 allow the enclosure (167) of the imaging apparatus assembly (101) to be mounted in a vertical edge (119) of two substantially orthogonal walls (171 and 172) of a room (109), as schematically shown in FIG. 2.

In FIG. 2, the orthogonal mounting surfaces (162 and 163) are not visible from the shown perspective as they face walls (171 and 172) respectively. In FIG. 3, the enclosure (167) of the imaging apparatus assembly (101) is displayed with the orthogonal mounting surfaces (162 and 163) facing the viewer of FIG. 3.

Such a particular geometry of at least two orthogonal mounting faces has the advantage that the walls (171 and 172) and/or ceiling (173) of the room (109) serve to constrain the large number of possible orientations in which the imaging apparatus assembly (101) could be mounted within a room (109), when the enclosure (167) of the imaging apparatus assembly (101) is mounted at locations where the walls (171 and 172) and/or ceiling (173) of the room (109) join each other at a corner of the room (109). The remaining variables of mounting such an imaging apparatus assembly (101), containing at least two orthogonal mounting surfaces, in a substantially orthogonal vertical edge (119) of a room (109) are the possible mounting height of the imaging apparatus assembly (101) from the floor (127) of the room (109) and the relative orientation (e.g., up vs. down) of the enclosure (167), along the vertical edge (119) of the room (109).

In any given case the mounting procedure of such an imaging apparatus assembly (101) having the enclosure (167) with the particular geometry is sufficiently simple to be performed by a person without any technical skills or tools. For example, the installation of the assembly (101) can be performed by attaching a double sided adhesive tape (e.g., as an adhesive element) to one, or two mounting surfaces (162 and 163) (and/or optionally surface (164)) of the enclosure (167) of the imaging apparatus assembly (101) and bringing the surfaces into contact with the vertical walls (171 and 172) as illustrated in FIG. 2, respectively (and optionally in contact with the ceiling (173)). The installation can be performed as well by bringing the enclosure (167) in contact with only one mounting face (162 or 163) (whichever contains an adhesive film for example) to the wall (171 or 172), respectively, in close proximity of the of the vertical edge (119) of a room. The orthogonal mounting faces (162 and 163) provide an intuitive shape for an installer to mount it in a substantially orthogonal edge of a room. Further, the solution allows the enclosure (167) of the imaging apparatus assembly (101) to be installed by a person with non-steady or shaky hands or arms. In fact, it requires very low motoric or tactile sensitivity to bring the orthogonal surface into contact with or in close proximity of a vertical edge (119) of a room, thus to mount the enclosure (167) appropriately within a room (109).

Such an enclosure geometry can include for example a tetrahedral shape as displayed schematically in FIG. 2 and FIG. 3, where the tetrahedron may optionally include a third orthogonal mounting surface (164) for contacting the ceiling (173) during the installation (with or without an adhesive/attachment element). The mounting surfaces (e.g., 162, 163, and/or 164) are planar and either solid or perforated, provided there is enough material to provide an attaching surface to be attached to the wall (171) and/or the wall (172) (and/or the ceiling (173)) of the room (109).

The enclosure (167) of the imaging apparatus assembly (101) may also include a room-facing base face (165), in the example of a tetrahedral shape opposite to the vertex (161) of the orthogonal faces (referred to as orthogonal vertex (161)). The base face (165) is displayed schematically in FIG. 2.

Preferably, the base face (165) is not transparent; and the imaging apparatus (175) is not visible to a person (131) within the capturing field of the thermal camera (175).

Figure 7:
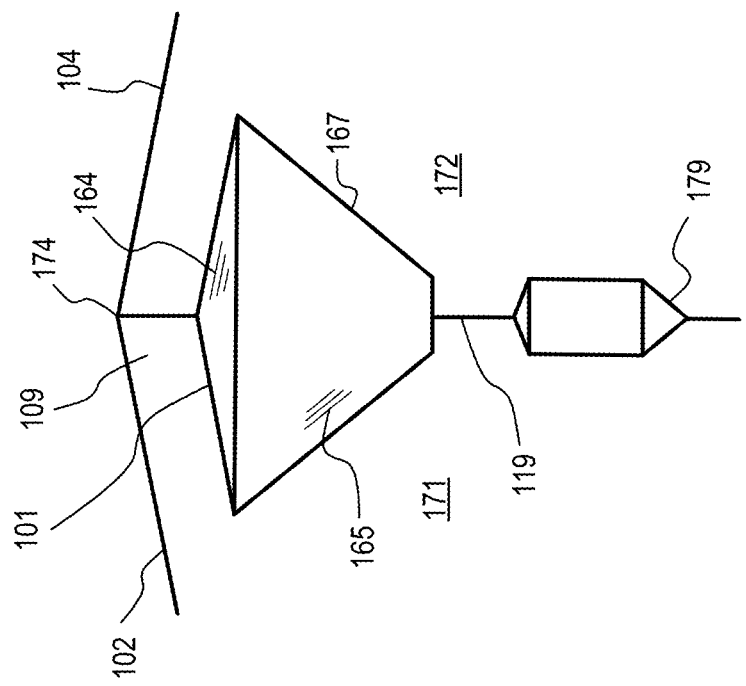
FIGS. 6 and 7 show an imaging apparatus assembly having a replaceable battery unit on its bottom corner.
Figure 6:
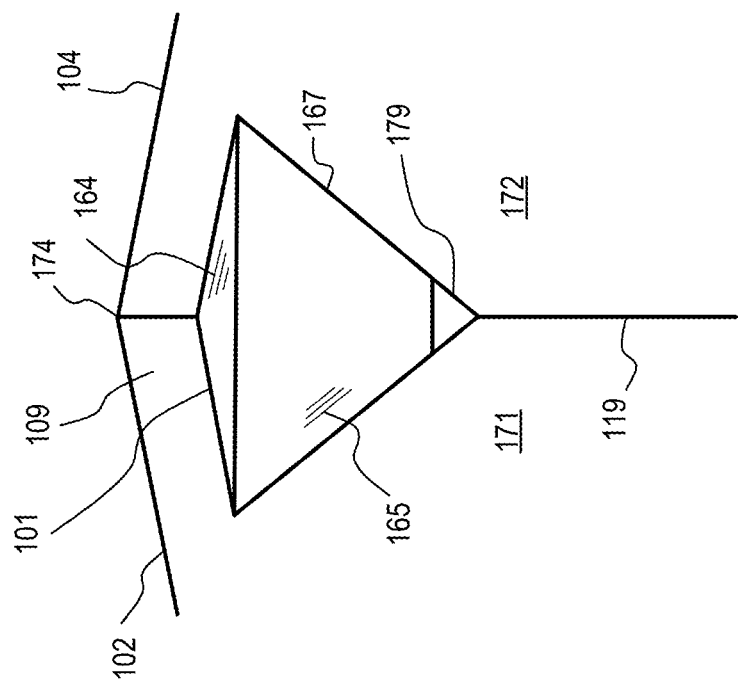

FIGS. 6 and 7 show an imaging apparatus assembly having a replaceable battery unit on its bottom corner.

In FIGS. 6 and 7, the imaging apparatus assembly (101) is schematically shown with a replaceable battery unit (179) on its bottom corner. An exchangeable or replaceable unit does not need to be on the bottom corner and can be positioned elsewhere within the enclosure (167). In the schematic example of FIGS. 6 and 7, a replacement battery unit (179) can be detached from enclosure (167) by simply pushing it in once. The attachment mechanism of the replacement battery unit (172) to the enclosure (167) can be through a lock spring, similar to card adapters, where a "push in, push out" mechanism is used to attach or detach a part into its dedicated socket. The replacement battery unit (179) can be either replaced by a new battery unit or can have interfaces, such as a USB interface so it can be recharged through a USB interface. Optionally, a secondary battery unit can be integrated within the enclosure (167) (not visible from the perspective view of FIGS. 6 and 7); thus, if the replaceable battery unit (179) is ejected out of the enclosure (167), power supply for the operation of the imaging apparatus (175) within the enclosure (167) is temporary provided by the secondary battery while the replaceable battery unit (179) is being replaced.

The base face (165) can have a shape of an equilateral triangle (all 60 degree angles—as shown schematically in FIGS. 1-5, for example) or be non-regular or be a spherical or planar surface.

Figure 9:
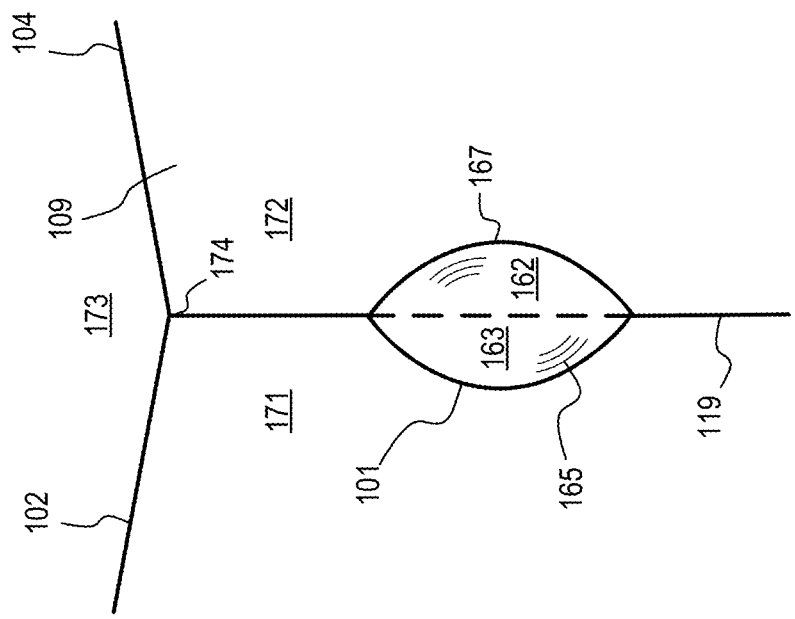
FIGS. 8 and 9 show imaging apparatus assemblies having alternative shapes for their base faces.
Figure 8:
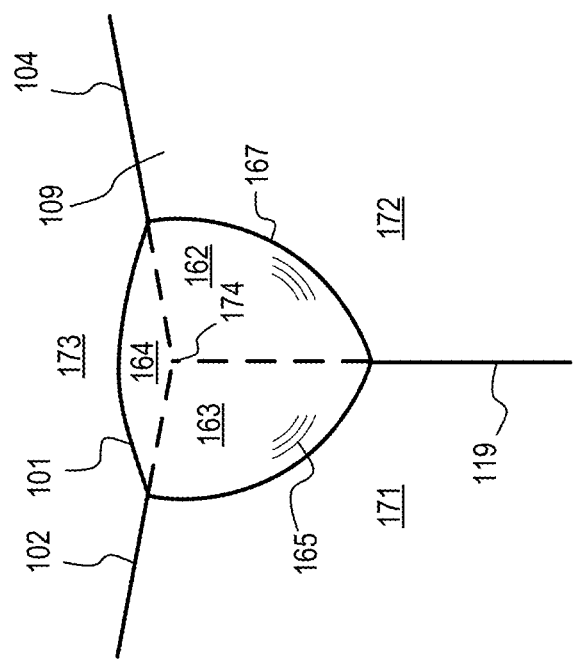

In other implementations, the base face (165) of the enclosure (167) of the imaging apparatus assembly (101) has a curved or spherical shape, as indicated schematically in FIGS. 8 and 9.

FIGS. 8 and 9 show imaging apparatus assemblies having alternative base face shapes.

The implementation illustrated in FIG. 8 contains three orthogonal mounting faces (162, 163, and 164), which are not visible from displayed perspective. The mounting faces (162, 163, and 164) and are planar and either solid or perforated, provided there is enough material to provide an attaching surface to be mounted onto wall (171, 172), and/or ceiling (173) of the room (109).

In some implementations, an enclosure (167) having a spherical-shaped base face (165) can provide up to three orthogonal mounting surfaces and contain a shape which can be described as an eighth slice of a round spherical or elliptical geometry (ball, for example) (as illustrated in FIG. 8), or a quarter slice of a round spherical or elliptical geometry (as illustrated in FIG. 9).

In such an implementation, the enclosure (167) can be mounted in a substantially orthogonal ceiling corner (174) of the room (109) (e.g., as illustrated in FIG. 8), if the installer is capable of reaching the room (109) in a convenient way. Otherwise, such implementation can be mounted in the vertical edge (119) of a room (109) with a distance of separation between the top surface (164) of the imaging apparatus assembly (101) and the ceiling (173).

In some instances, the ceiling (173) has a strip of material between the transition of the ceiling to the vertical wall (cove, mold or tray ceiling) and in such instances the enclosure (167) can be mounted in the vertical edge (119) of a room (109), as illustrated in FIG. 9.

In general, the enclosure (167) of the imaging apparatus assembly (101) (e.g. having an overall tetrahedron shape, or a spherical/elliptical/ellipsoidal shape) has two or three orthogonal surfaces, one or more of which surfaces can be optionally configured with adhesive to serve as adhesive mounting surfaces for bonding to a wall (171 or 172) and/or a ceiling (173). In some instances, only one mounting surface is configured with an adhesive layer for attaching to a wall (171 or 172) or a ceiling (173). By bringing the enclosure (167) of the imaging apparatus assembly (101) in contact with a wall in close proximity to a vertical edge (119) or a ceiling corner (174) of a room (109), the imaging apparatus assembly (101) can adhere to the wall without the requirement of any technical tools or skills, in an uncomplicated mounting procedure under a simple set of instructions.

In some implementations the enclosure (167) of the imaging apparatus assembly (101) has only two orthogonal mounting faces (162) and (163) and a curved base face (165) (e.g., having the shape of a portion of a spherical or elliptical surface). The curved based face (165) connects the two orthogonal mounting faces (162 and 163) as illustrated schematically in FIG. 9.

The shape of the enclosure (167) illustrated in FIG. 9 may be described as a quarter ellipsoid shape, sliced along the long axis of the ellipsoidal shape. An orientation indicator can be provided on a mounting surface (162 or 163) (not visible in FIG. 9) to indicate the desired mounting orientation of the ellipsoid shape enclosure (167) along the vertical edge (119) of the room (109). For example, the orientation indicator may be a single point with a separate set of instruction explaining that when mounting the enclosure (167) in a vertical edge of the room that the point shall be closer to the ceiling of the room to ensure proper orientation of the enclosure (167).

In some implementations, the enclosure (167) of the imaging apparatus assembly (101) does not contain more than 3 orthogonal mounting faces (each is orthogonal with respect to remaining mounting faces), to enable and ensure installation simplicity.

One advantage of this mounting procedure is that the vertical walls serve to constrain the orientation of the enclosure (167), ensuring that the orientation of the base face (165) to the room's floor and walls is known with a high degree of confidence and without the needs to measure the orientation after the installation.

Further examples of the designs of enclosures can be found in U.S. patent application Ser. No. 29/604,436, filed May 17, 2017 and entitled "Camera Enclosure", the disclosure of which is hereby incorporated herein by reference.

Figure 10:
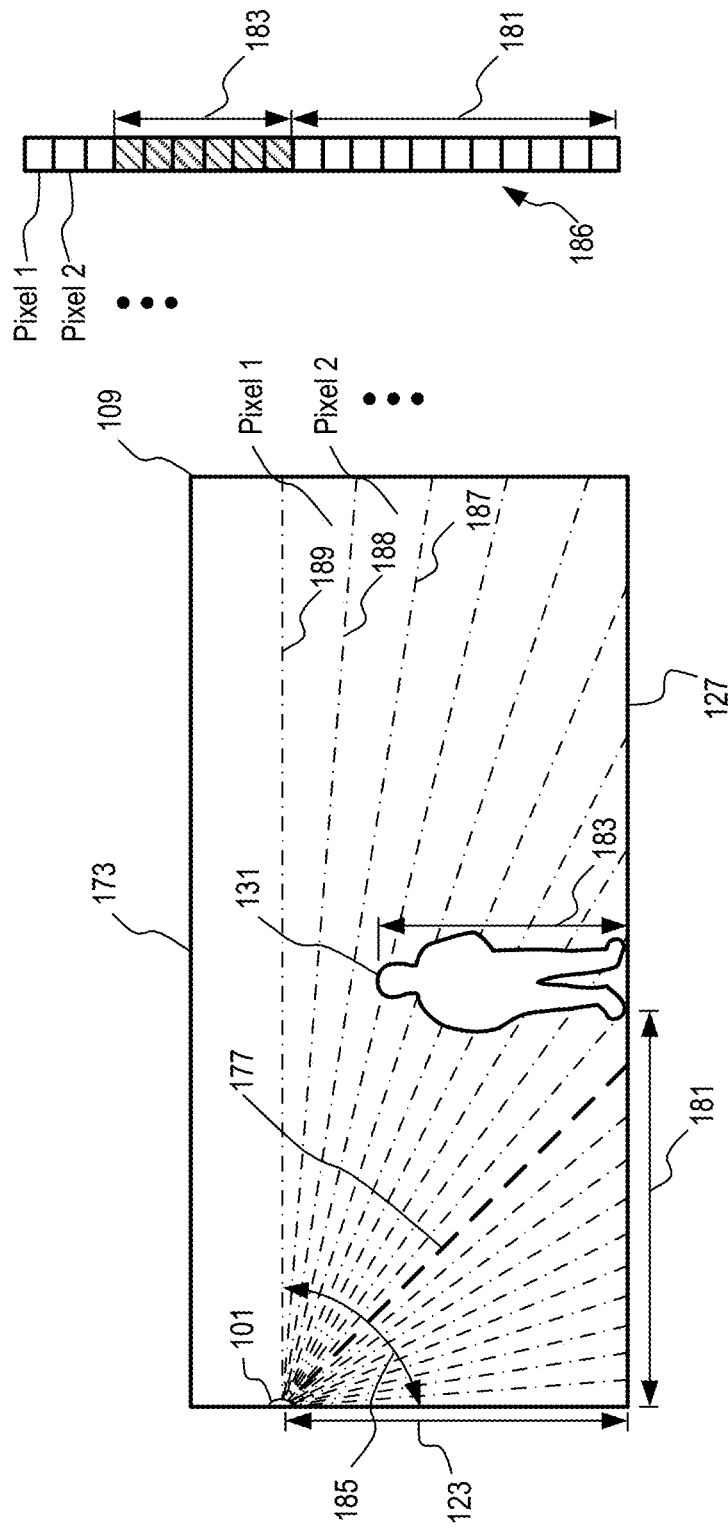
FIG. 10 illustrate geometrical relations among the mounting position of an enclosure, the orientation of the optical axis of an imaging apparatus housed within the enclosure, the field of view of the imaging apparatus, and the space within the room that can be captured in images obtained from the imaging apparatus housed within the enclosure.

FIG. 10 illustrate geometrical relations among the mounting positing of an enclosure (167), the orientation of the optical axis of an imaging apparatus housed within an enclosure (167), the field of view of the imaging apparatus, and the space within the room that can be captured in images obtained from the imaging apparatus housed within the enclosure (167).

Within the thermal image assembly (101), the imaging apparatus (175) is mounted to have a predetermined orientation with respect to its enclosure (167) (e.g. a desired alignment of its optical axis (177) with respect to the base face (165)), such that when the enclosure (167) of the imaging apparatus (175) is mounted in alignment with the walls (171, 172) and/or ceiling (173) of the room (109), the imaging apparatus (175) achieves substantial alignment with the area of interest in the room (109). This mounting of the imaging apparatus (175) with respect to the enclosure (167), in conjunction with the alignment of the base face (165) constrained by positioning the enclosure (167) of the thermal image assembly (101) in a room corner (174) or room's vertical edge (119), ensures the imaging apparatus (175) views the room (109) on a well-defined axis (177) with respect to walls (171 and 172) and the floor (127) of the room (109).

The desired orientation of the axis (177) of an imaging apparatus (175) with respect to the enclosure (167) depends on a number of factors, for example to best serve the imaging apparatus and application, to achieve a desired apparatus coverage or to target a particular room geometry.

In one implementation, the mounting of the imaging apparatus (175) within the enclosure (167) is arranged so that the imaging axis (177) equally bisects the angle between the two mounting walls (171 and 172) to the horizontal.

In one implementation, the mounting of the imaging apparatus (175) within the enclosure (167) is arranged so that the imaging axis (177) equally is perpendicular or is tilted with respect to the vertical edge of the room.

In some instances, the imaging apparatus (175) has a field of view (capturing viewing angle) of 90 degrees or more. When such an imaging apparatus is used, a symmetrical orientation of the image apparatus (e.g., the imaging apparatus (175)) fixation within the enclosure (167) in an orthogonal room can result in substantially full room coverage or coverage of a reasonable proportion of the room.

In some instances, the enclosure (167) houses two or more imaging apparatuses (e.g., imaging apparatus (175)). In such instances the enclosure (167) includes a fixation mounting for each imaging apparatus (175) which allows the optical axis (177) of each to be fixed relative to the base face (165). In one possible implementation, the optical axes (177) of the imaging apparatuses can be distributed evenly in a horizontal plane and/or a vertical plane.

In some instances, the optical axis (177) may have an inclination angle from the horizontal plane that is parallel to the ceiling plane (173) or the floor plane (127). The mounting of the enclosure (167) can be performed at a height at or above a typical human's head or even in the ceiling corner (174) of a room (109), so that the imaging apparatus (175) has an optical axis (177) being oriented towards the room, containing an inclination angle relative to the horizontal plane, with the apparatus "looking down" on the room (109). The orientation marker (169) on the enclosure (167) functions as an indicator for ensuring that the enclosure (167) is in the correct orientation for the imaging apparatus to be facing towards the room and towards the floor (127) of the room (109).

In general, multiple imaging apparatuses can be housed within the enclosure (167) of the imaging apparatus assembly (101), depending on the size of the field of view of the imaging apparatuses. For example, when an imaging apparatus has a field of view of 90 degrees or more is used for corner or edge mount, one imaging apparatus may be sufficient. When imaging apparatuses each having a limited field of view (e.g. 30 degrees), an array of imaging apparatuses (e.g. 3×3) can be configured to stitch together the fields of views to cover the room.

The problem of the imaging apparatus (175) (or multiple thereof) within the enclosure (167) being visible to a person standing in front of the enclosure (167) is solved by a base face (165) which is visually opaque or translucent from the outside of the enclosure (167).

Such a visibly opaque surface could be an infrared-transparent material if the imaging apparatus (175) inside the enclosure (167) detects or emits in the infrared band (e.g., as in the related applications identified above). In some implementations such a visibly opaque, but infrared-transparent surface can be made out of polymer material, such as polyethylene (PE) or polypropylene (PP). Such polymer materials appear white and non-transparent in the visual band for the human eye, but can be transparent in the infrared band. Other visually non-transparent, but infrared transparent materials include Germanium (Ge) or Silicon (Si). These materials appear in the visual band, for the human eye, "black" and visible light cannot pass through such materials due to no transmission in the visual band. In another instance it may be a partially transparent mirror (one-way or two-way mirror; a visually transparent material coated with a thin metallic layer) where a person facing the plane sees a reflective surface as the base face (165), while the imaging apparatus (175) can image through the partly visually transparent surface.

In at least some embodiments, the enclosure (167) of the imaging apparatus (175) is configured for simplicity of mounting procedure, with the fixed, "self-aligned" viewing angle of an imaging apparatus (175) configured within the enclosure (167) that has an orientation constrained by its mounting surfaces contacting the walls of a substantially orthogonal vertical edge of a room. Thus, if the particular orientation of the imaging apparatus (175) within the enclosure (167) is known, the angle of the field of view (185) of the imaging apparatus (175) is known, and the approximate mounting height (123) is known, the space that is monitored by the imaging apparatus can be computed to determine whether it includes the one or multiple standing subjects (131) having a height (183) and positioned with a distance (181) and an angle within the horizontal plane of the room (109) (e.g., relative to the walls (171 and 172).

On the other side, in order to provide the desired space covered by the thermal imaging assembly (101), the desired mounting height (123) can be computed from the distance (181) between the furthest subject having height (183), the orientation of the field of optical axis (177) relative to the imaging apparatus assembly (101), and the angle of the field of view (185) of the imaging apparatus (175). The orientation of the field of optical axis (177) relative to the enclosure (167), and the angle of the field of view (185) of the imaging apparatus (175) is predefined by manufacturing of enclosure (167) in one embodiment.

In one implementation, the set of mounting instructions for a user/installer instructs the user to peel off protective layer from a double sided adhesive tape, which is already pre-installed by default on mounting surface (162 and/or 163) of the enclosure (167) of the imaging apparatus assembly (101), and mount the enclosure (167) into a substantially orthogonal vertical edge (119) of a room (109), at a height (123) of approximately 6 feet or higher above the floor (127).

In some implementations, the imaging apparatus (175) inside the enclosure (167) has, for example, about 30×20 pixels with a horizontal and vertical field of view (185) of slightly larger than 90 degrees. The imaging apparatus (175) being battery operated, activated by the user by, for example, pushing a button on the mounting surface (162), or releasing a contact-stopping tape from battery compartment, or activating remotely via a handheld computer (e.g., 117)). The imaging apparatus assembly (101) streams the recorded footage wirelessly to a receiver (e.g., using a wireless transmitter for wireless local area network, wireless personal area network, Wi-Fi, Bluetooth, Zigbee, radio transmission, cellular communications, etc.). The low resolution of the imaging apparatus (175) provides privacy protection to occupants of the room. In such an implementation, the base plane (165) can be a white, visually non-transparent film, made out of a thin PE-membrane, hiding the content of the enclosure (167) and in particular the imaging apparatus (175).

The orientation of the imaging apparatus (175) inside the enclosure (167) can be such that it is symmetric in the horizontal plane and symmetric to the vertical plane, where the horizontal plane can be defined as substantially plane parallel to the floor (127) of the room (109) and the vertical plane can be defined as substantially plane parallel to one of the mounting walls of the room. For example, the orientation of the imaging apparatus (175) inside the enclosure (167) can be such that its optical axis (177) is 45 degrees downward relative to the back edge (166) that joins the faces (162 and 163) and have equal angles relative to the faces (162 and 163). For example, the orientation of the imaging apparatus (175) inside the enclosure (167) can be such that its optical axis (177) is aligned in the plane that bisect the enclosure (167) vertically (e.g., passing through the vertical edge that joins the faces 2 and 3) and have a predetermined angle (e.g., 45 degrees) relative to the vertical edge. With the known orientation of the camera preset at manufacture, its preset field of view (185) and its approximate mounting height (123), the captured image can be analyzed for the position of a subject (131) within the field of view (185) and the height (183) of the subject (131) as well as the width, as schematically shown in a cross-section 2-dimensional view of FIG. 10.

In FIG. 10, when the mounting height (123) of the imaging apparatus assembly (101) is known, for example by any of the methods discussed above in connection with FIGS. 11-13, and the optical axis (177) and the field of view (185) are known from the design and manufacture of the enclosure (167) of the imaging apparatus assembly (101), then the observable spatial position and the distance (181) between a subject or object (131) within the field of view of the apparatus 20 can be determined.

In FIG. 10, the dotted lines from the imaging apparatus assembly (101) reversely project the pixels to the floor (127) and the wall on the opposite side. The thermal radiation between adjacent dotted lines is measured by a corresponding pixel in an imaging apparatus (175) in the imaging apparatus assembly (101). Thus, the spaces between the dotted lines represent the spaces imaged by the corresponding pixels.

For example, the thermal radiation projected to the imaging apparatus assembly (101) between the dotted lines (188 and 189) is measured by pixel 1; and the thermal radiation projected to the imaging apparatus assembly (101) between the dotted lines (187 and 188) is measured by pixel 2; etc. The thermal intensity measured by the pixels 1, 2 and others form a vertical line (186) of pixels in a thermal image. The thermal image (131) of the subject or object (131) is represented by the shaded pixels (183). For the given mounting height (123) and the field of view (185), a count of pixels (181) up to the bottom of the thermal image (133) of the object (131) corresponding to a determined horizontal distance (181) between the location of the subject or object (131) and the edge (119) on which the imaging apparatus assembly (101) is mounted. The count of the shaded pixels represents the height (183) of the thermal image (133) of the subject or object (131) in the image coordinate system (139), which corresponds to the real world height of the subject or object (131) above the floor (127) of the room (109) in view of the mounting height (123). The geometrical relation can also be used in reverse direction to determine the mounting height (123) based on the real world height of the subject or object (131) and the count of the shaded pixels that represents the height (183) of the thermal image (133) of the subject or object (131) at a location identified by the count of pixels (181) below the shaded pixels.

In FIG. 10, the one-dimensional vertical pixel row (186) shows how the subject (131) in the room (109) appears in the thermal image captured by the imaging apparatus assembly (101). The radiation from the subject (131) causes the shaded pixels to be measured to have a temperate significantly different from the other areas that are measured by the non-shaded pixels. The non-shaded pixels represented the portion of the room measured at the room temperature; and the shaded pixels represented the elevated surface temperate of the subject (131) over the room temperature.

In FIG. 10, the vertical row of pixels (186) are identified as with "Pixel 1", "Pixel 2", etc., which correspond to the imaged spaces marked corresponding with "Pixel 1", "Pixel 2", etc.

Assuming the subject (131) is standing vertically within the room (109), his or her height (183) and position (181) can be determined by trigonometric relations. Analogue example is valid for the horizontal dimension, which allows the determination of the subject's or object's position within the horizontal dimension and its width. This is valid for any object having a temperature different from the room temperature in case of imaging in thermal infrared.

For example, hot-spots or cold-spots can be allocated by knowing their position and their relative size, in addition to its relative temperature. Hot-spots could include hazardous items such as for example an iron that was accidently forgotten to be turned off by a user and left was unattended and can be a potential fire or safety hazard, or cold-spots could include an open window when very cold air is streaming into the room that was forgotten to be closed by a person. Many cold-spots and hot-spots can be detected by a low resolution thermal imaging apparatus. Accordingly, 3 dimensional information of the viewing scenery can be reconstructed of the recorded image of the imaging apparatus assembly (101).

The example of FIG. 10 is simplified to a cross sectional, two-dimensional case with one vertical pixel row (186) of 20 pixels, representing the vertical imaging capacity of the imaging apparatus assembly (101) in such an example. The imaging apparatus has preferably a viewing capacity of an array of rows, equivalent to a matrix of pixels of, for example, 30 pixels in the horizontal direction by 20 pixels in the vertical direction.

Optionally, additional functions may be integrated within the enclosure (167) of the imaging apparatus assembly (101), such as a decorative surface on the visible side of the base face (165), lighting, Wi-Fi access point/repeater, etc.

Optionally, the enclosure (167) of the imaging apparatus assembly (101) can have rounded corners/edges and a rounded vertex (161) for easier fit/mount into a rounded vertical edge or a rounded corner of a room.

Optionally, an adapter enclosure is permanently fixated and mounted on the walls and the enclosure (167) of the imaging apparatus assembly (101) containing the imaging apparatus (175) and/or other parts thereof (e.g. battery) is attached to the adapter enclosure such that the imaging apparatus assembly (101) can be easily replaced without the need of demounting the entire assembly.

Optionally, any part of the imaging apparatus assembly (101) disposed within its enclosure (167), such as one or the multiplicity of the imaging apparatus (175), the battery, the wireless module, the electronic board, etc. can be designed to be exchangeable or replaceable within the enclosure (167), while the enclosure (167) can be permanently fixated and mounted on the walls without the need of demounting the entire assembly. For example, a battery module can be replaceable in a way as illustrated in FIGS. 6 and 7; and other replaceable modules can be similarly configured for the imaging apparatus (175), an optional wireless module, etc.

In some instances, wedges are provided for mounting between the enclosure (167) of the imaging apparatus assembly (101) and the wall(s) (e.g., 171 and 172) and/or the ceiling (173), if walls and/or the ceiling of the room (109) are not substantially orthogonal to each other.

At least some embodiments disclosed herein provide a user friendly way to determine the installation configuration of a thermal imaging assembly, based on the thermal images captured at the time of the calibration of the thermal imaging assembly in a thermal imaging system and user inputs provided in connection with the thermal images. The user inputs train the thermal imaging system to gain knowledge about the environment in which the thermal imaging assembly is installed and configured to monitor. The configuration parameters and the knowledge about the environment are used subsequently to interpret the images obtained at a time of monitoring service and generate monitoring outputs, such as identifying the presence, location, and/or activities of humans, telling adults, children, and pets apart, etc.

For example, the user may provide the height of a person (e.g., the user) detectable in the thermal images during the installation/calibration of the thermal imaging system to allow the system to compute a mounting height of the thermal imaging assembly. Other user inputs may include an indication of the time instance when the user is at a point of interest (POI) (e.g., room corner, door), identification of a POI, etc., to allow the system to learn the locations of the POI in the imaging coordinate system, where the POI may not be visible or recognizable from the thermal image directly.

During the installation/calibration, the system may instruct the user to perform activities, such as walking away or to the camera, going to a point of interest, walking along a path way in an area monitored by the camera, walking in an area heavy for foot traffic, etc. The user activities generate thermal images from which the system learns the geographical configuration of the monitored environment.

Based on the user inputs and/or the thermal images collected during the installation/calibration, the system computes configuration parameters, such as the mounting height of the thermal imaging assembly, a ratio or mapping between a size in the image and a size of a person/object in the monitored area, and the identification of POIs in images captured by the thermal camera. The system bookmarks the locations, paths, and/or areas of interest as knowledge about the environment in which the thermal imaging assembly is installed and configured to monitor.

For example, a mobile application is configured in one embodiment to ask the user to enter the height of the user captured in a thermal image presented on the mobile application. Once the mobile application detects the user in the image, the application may instruct the user to perform an act, such as entering the height of the user, or going to a point of interest, such as a corner of the room, a door or window of the room, etc. The mobile application (or a remote server) extracts location and/or size data from the thermal images of the user performing the act and correlate the instruction and/or optional input from the user to determine configuration parameters, such as the mounting height of the thermal camera, the location of the point of interest in the thermal image coordinate system, a location mapping between the thermal image coordinate system and a coordinate system aligned with the room, a size mapping between the object sizes measured in the thermal image coordinate system and the real world object sizes in the room coordinate system.

Figure 11:
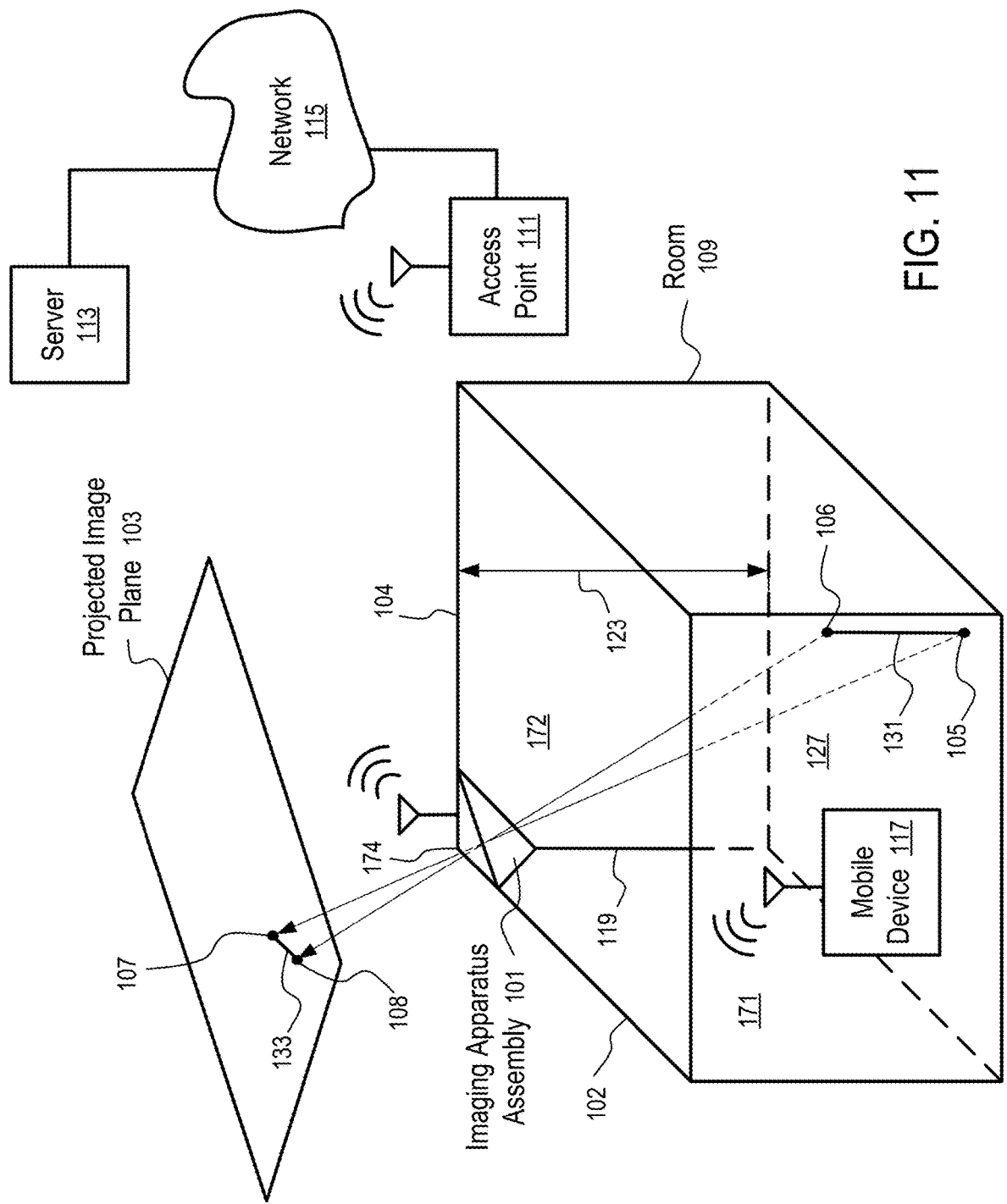
FIG. 11 shows a thermal imaging system according to one embodiment.

FIG. 11 shows a thermal imaging system according to one embodiment.

In FIG. 11, the thermal imaging system includes an imaging apparatus assembly (101) and a server (113) that processes the thermal images captured by the thermal camera included in the imaging apparatus assembly (101) and provides services based on the thermal images.

In FIG. 11, the imaging apparatus assembly (101) communicates the thermal images to the server (113) via a wireless access point (111) and a computer network (115) (e.g., a local area network and/or the Internet). A mobile device (117), such as a smartphone, a tablet computer, a laptop computer, or a personal media player, has a mobile application installed therein to communicate with the imaging apparatus assembly (101) and/or the server (113) for the calibration, setup, and/or the usage of the thermal imaging system.

In some instances, the imaging apparatus assembly (101) communicates the raw footage (e.g., via a wireless connection or a wired connection) to the mobile device (117) and/or the server (113) without performing any image processing within the enclosure (167) of the imaging apparatus assembly (101). A host device (e.g., the mobile device (117) or another computer in the room (109), or in the vicinity of the room (109)), or the server (113) that is remote to the installation site, performs image processing to provide the user interfaces and/or compute configuration parameters, as discussed below in detail. In some instances, the server (113) is implemented using the cloud computing third-party service provided via serverless architectures.

In FIG. 11, the imaging apparatus assembly (101) is mounted at a location in an environment, such as a room (109), that is being monitored by the imaging apparatus assembly (101).

Preferably, the imaging apparatus assembly (101) is mounted on a vertical edge (119) where two walls (171 and 172) of the room (109) meet each other, a horizontal edge (102 or 104) where a wall (e.g., 171 or 172) and the ceiling of the room (109) meet each other, or a corner (174) of the room (109) where two walls (171 and 172) of the room (109) meet the ceiling of the room (109). Alternatively, the imaging apparatus assembly (101) may be mounted at other locations, such as on a location on a surface of a wall (e.g., 171 or 172) or ceiling, or any arbitrary place within the scenery. For example, the imaging apparatus assembly (101) can be configured to be mounted on the ceiling of a room for top-down monitoring; and the imaging apparatus assembly (101) may be mounted on and/or with holders and/or devices, such as IP camera, passive infrared sensor (PIR), etc.

Preferably, the imaging apparatus assembly (101) has an enclosure (167) or housing that has surfaces adapted to be aligned with the surfaces of walls (e.g., 171 or 172) and/or the ceiling of the room (109). Thus, the alignment of the orientation of the imaging apparatus assembly (101) with respect to the vertical direction and the horizontal direction can be easily achieved by pressing two or more mounting surfaces of the enclosure (167) or housing of the imaging apparatus assembly (101) against the flat surfaces of the wall(s) (171, 172) and/or the ceiling of the room (109).

For example, the external mounting surfaces of the enclosure (167) or housing of the imaging apparatus assembly (101) of one embodiment have pre-applied adhesive materials covered with protection strips that can be peeled off to reveal the adhesive materials for mounting. When the enclosure (167) or housing of the imaging apparatus assembly (101) is pressed against the edge (119) or corner (174) at the mounting location, the mounting surfaces of the enclosure (167) or housing of the imaging apparatus assembly (101) align with, and adhere to, the surfaces of the wall(s) and/or ceiling. The alignment of the mounting surfaces of the enclosure (167) or housing with the wall and/or ceiling surfaces results in the alignment of the imaging apparatus assembly (101) with respect to the horizontal and/or vertical directions in the room (109).

In some instances, the enclosure (167) or housing of the imaging apparatus assembly (101) is fixedly attached to the mounting location via elements, such as nails, screws, etc.

When the imaging apparatus assembly (101) is mounted in the room (109) with proper horizontal and vertical alignment, the camera in the assembly (101) has a known orientation with respect to the orientation of the room (109). However, the mounting height (123) (e.g., the vertical distance from the floor (127) to the imaging apparatus assembly (101)) is not yet known to the imaging system.

The mounting height (123) may be measured (e.g., using a measuring tape) and provided to the system via a user interface, such as a graphical user interface provided by a mobile application running on the mobile device (117). In some instances, the orientation of the imaging apparatus assembly (101) can be determined automatically from tilt sensors and/or other sensors (e.g., a set of accelerometers and/or a set of magnetic sensors).

Alternatively, when the imaging apparatus assembly (101) has two cameras mounted within their enclosure (167) (or adjacent room corners) with a known distance to each other, the server (113) can use a stereoscopic vision provided by the cameras to determine the mounting height a stereoscopic view of one or more reference object(s).

Alternatively, when the imaging apparatus assembly (101) has a distance measurement sensor that measures a distance based on the time of flight (TOF) of a signal, the imaging apparatus assembly (101) can measure its mounting height from the floor plane (127) automatically. The TOF can be measured based on ultrasonic signs, or radio frequency signals. Alternatively, the mounting height may be measured via barometric and/or motion sensors. In some instances, the imaging apparatus assembly (101) includes sensors and/or devices, such as GPS receivers to the determined the location of the imaging apparatus assembly (101), magnetic sensors for determine the orientation of the imaging apparatus assembly (101) relative to the magnetic field of the Earth, light and/or audio devices for provide visual and/or audio feedback and/or alerts, air quality monitoring devices, etc.

In a preferred embodiment, the imaging system determines the mounting height based on measuring the size of a reference object (131) in a thermal image and receiving an input of the real world size of the reference object.

For example, the reference object (131) in FIG. 11 has a top point (106) and a bottom point (105) that are captured in the thermal image generated by the imaging apparatus assembly (101). The thermal image of the monitored area illustrated in the projected image plane (103) has an image (133) of the reference object (131) with a corresponding top point (108) and a corresponding bottom point (107). A measurement of the size of the image (133) of the reference object (131) and an input identifying the real world size of the reference object (131) can be used to compute the mounting height (123), as further discussed below in connection with FIG. 12.

For example, the reference object (131) can be the person installing, calibrating, and/or setting up the imaging apparatus assembly (101), or another person in the monitored area of the room (109); and the height of the person is the real world size of the reference object (131) in the computation of the mounting height (123). Such an approach greatly simplifies the process to calibrate and/or set up the thermal imaging system.

Figure 12:
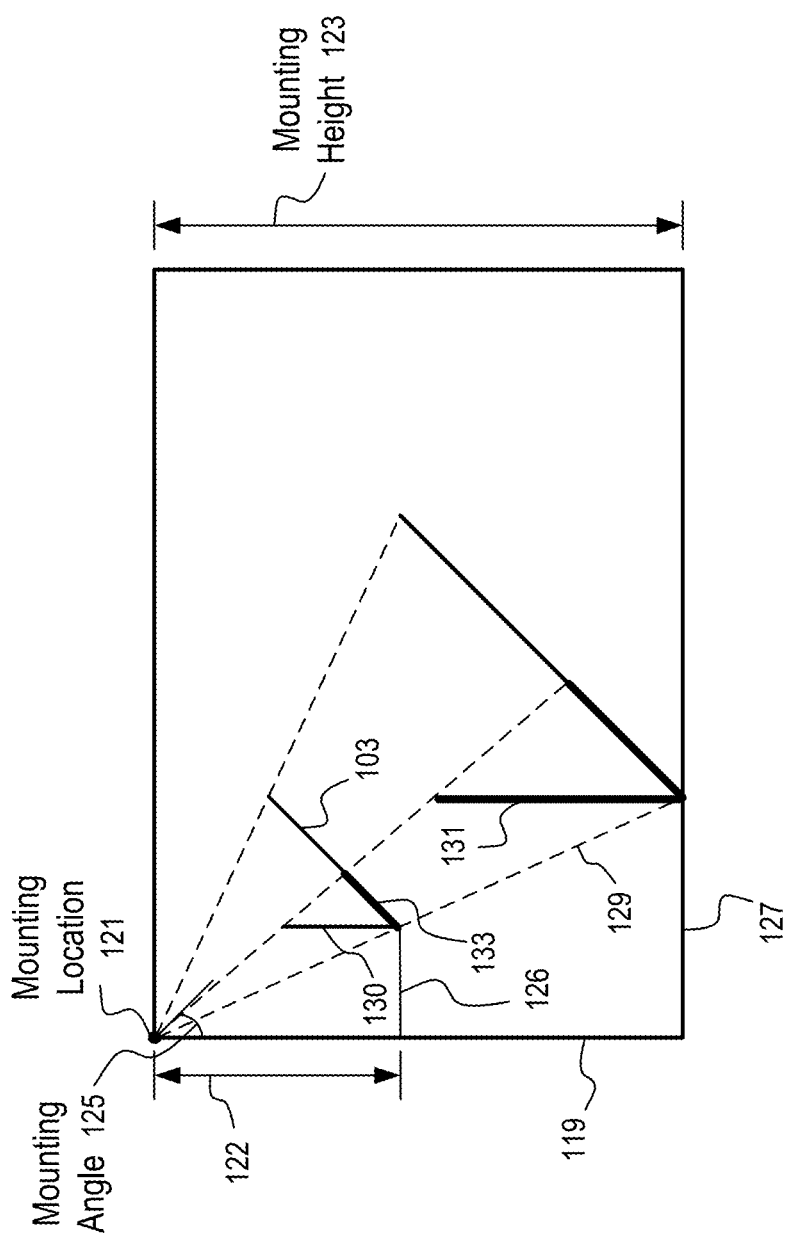
FIG. 12 illustrates a method to measure mounting configuration parameters of a thermal imaging camera according to one embodiment.

FIG. 12 illustrates a method to measure mounting configuration parameters of a thermal imaging camera according to one embodiment. For example, the method of FIG. 12 can be used to determine the mounting height of the imaging apparatus assembly (101) of the image system illustrated in FIG. 11.

In FIG. 12, the camera at the mounting location (121) has a determined mounting angle (125) with respect to its housing or enclosure (167) that is aligned with the room coordinate systems. The measurement of sizes in the captured thermal image is performed in a predetermined projected image plane (103), or image coordinate system, that corresponds to a predetermined mounting height (122) that has a fixed geometrical relation with respect to the image plane (103), as defined by the mounting angle (125). The predetermined mounting height (122) can be considered a reference mounting height from the reference floor (126); and a reference height (130) in the vertical direction is projected to have an image (133) in the projected image plane (103).

In FIG. 12, when the real world reference object (131) has the same size as the image (133) in the imaging plane (103), the ratio between the reference height (130) and the height of the real world reference object (131) is the same as ratio between the reference mounting height (122) and the real world mounting height (123) to the floor (127) on which the object (131) stands. Thus, the reference mounting height (122) can be scaled up to obtain the real world mounting height (123) based on the ratio between the reference height (130) and the height of the real world reference object (131). The reference height (130) can be determined from the size and location of the image (133) and the mounting angle (125) of the camera.

In one implementation, from the mounting angle (125), the reference mounting height (122), and the size and location of the image (133), a formula is derived to compute the reference height (130). The ratio between the height of the reference height (130) and the height of the real world reference object (131) can be used to scale the reference mounting height (122) to the real world mounting height (123).

In another implementation, the imaging apparatus assembly (101) is mounted in a reference room at a reference height (122). References of objects (e.g., 130) of different heights are positioned at the location of the object (130) illustrated in FIG. 12 to obtain images (e.g., 133) of different sizes and thus establish a mapping between the reference heights and the image sizes. When the real world object (131) generates an image size at the location in the image plane (103), the mapping can be used to look up the reference height (130) in the reference room. The reference mounting height (122) can then be scaled to the real world mounting height (123) to the floor (127) according to the ratio between the reference height (130) looked up from the mapping according to the size of the image (133) and the height of the real world reference object (131) that generates the image (133) of the same size in the image plane (103).

In one embodiment, the camera in the imaging apparatus assembly (101) has a limited field of view. For example, in FIG. 12, the camera may not be able to capture the area that is closer to the edge (119) than the line (129). Thus, when the object (131) generates image (133) that borders on the boundary of the image frame, the system may not be able to determine whether the image captures the entire object (131). Thus, the mobile application running in the mobile device (117) may provide instructions to move the object (131) such that the image (133) leaves the boundary of the image frame and the image (133) does not have pixels at the boundary of the image frame. As soon as the image (133) leaves the boundary, the system captures an image (133) of the object (131) and determines the reference height (130) that generates the same image size at the location.

In general, the mobile application may provide a display of the thermal image captured by the thermal camera assembly and provide instructions to guide the movement of the object (131) to a specific location in the room such that the object (131) is shown to be standing in a particular location in the thermal image. The size of the object (131) in the image is then used in combination with the real world size of the object (131) to compute the mounting height (123).

Figure 13:
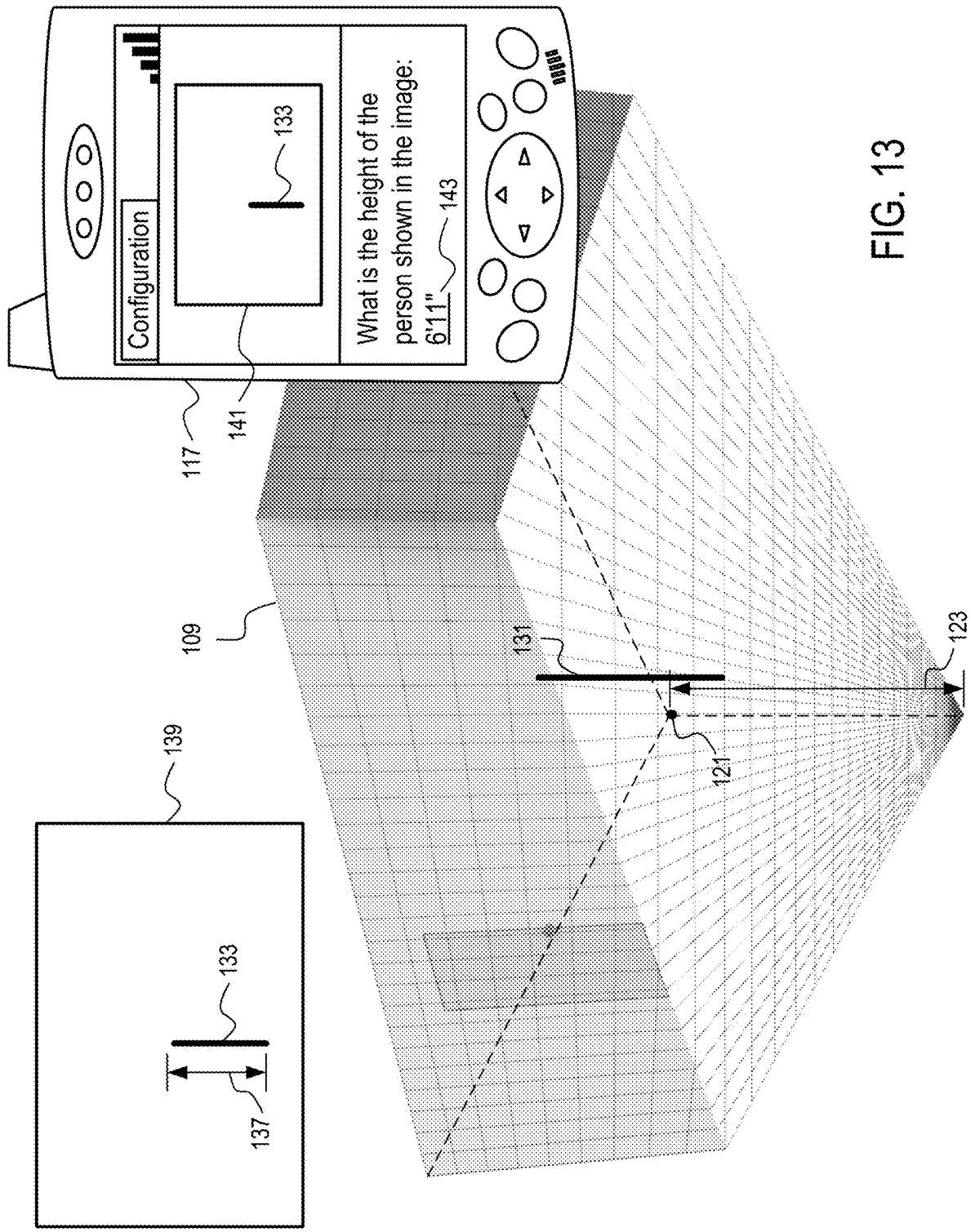
FIG. 13 shows a user interface to obtain a user input to determine a mounting height of a camera according to one embodiment.

FIG. 13 shows a user interface to obtain a user input to determine a mounting height of a camera according to one embodiment. For example, the user interface of FIG. 13 can be implemented on the mobile device (117) in the thermal imaging system of FIG. 11 to compute the mounting height using the method of FIG. 12.

In FIG. 13, after the imaging apparatus assembly (101) is mounted at the mounting location (121), the camera is configured to establish communications with the server (113) and/or the mobile device (117) to provide a thermal image of the monitored area of the room (109) for display on the mobile device (117). The thermal image (141) presented on the mobile device (117) (e.g., using a mobile application running in the mobile device (117)) has a thermal image (133) of an object (131) in the room (109) that has a temperature significantly different from the room temperate. For example, the object (131) is a person in the room (109), such as the installer or owner of the imaging apparatus assembly (101), or another person in the monitored area of the room (109). The user interface requests the user of the mobile device (117) to enter the real world height of the object (131) (e.g., a person) identified in the thermal image (141).

In some instances, when the thermal image (141) captures the thermal images of multiple objects, the user interface allows the user of the mobile device (117) to select an object (131) and specify the height of the selected object (131).

The thermal imaging system is configured to measure (e.g., by the mobile application running in the mobile device (141), the server (113), or the imaging apparatus assembly (101)) the height (137) of the thermal image (133) in an image coordinate system (139).

In some instances, the thermal imaging system is configured to measure the height (137) when the thermal image (133) is at a specific location in the image coordinate system (139) (e.g., when the thermal image (133) of the object (131) stands at a specific location in the image coordinate system (139)). In such implementations, the user interface may provide instructions to guide the movement of the object (131) such that the thermal image (133) stands at the specific location marked in the image (141) presented on the mobile device (117).

In other instances, the thermal imaging system can measure the height (137) to compute the mounting height (123) using the height (143) provided by the user of the mobile device (117), without requiring the object (131) to go to a specific location, as long as the thermal image (133) of the object is captured in the image (141) in entire (e.g., no portion of the object (131) is located in a blind spot of the imaging apparatus assembly (101)).

In some instances, the mobile device (117) instructs the user to move the object (131) (e.g., the user) around in the room, such that the height (137) of the thermal image (133) of the object (131) can be measured in a plurality of different locations to compute the mounting height (123) from the measurement of the corresponding locations. The computed results of the mounting height (123) can be combined (e.g., from an average of the results, or a weighted average the results) for improved accuracy.

After the mounting height (123) is determined, the thermal imaging system can map the coordinates in the image coordinate system (139) (of points with known or inferred height) to the coordinates in the room (109).

FIGS. 11-13 discussed the measuring of the mounting height of a thermal camera (imaging based on IR radiation). The technique can also be similarly extend to the determination of the mounting height of a camera that images based on lights that are visible to human eyes.

While an image of the room (109) captured based on visible lights may show features of the room (109) that can be used to automatically determine the layout of the room (109) (e.g., the floor boundaries and the location of points of interest, such as the door, window, furniture), a thermal image of the room (109) typically does not have sufficient features that can be used to identify the layout of the room (109), even to a human, especially when the thermal image has a low resolution to protect the privacy of the occupants of the room (109).

In some instances, the imaging system as illustrated in FIG. 11 is configured to automatically calibrate and/or re-calibrate the mounting height (123) and/or other configuration parameters (e.g., POI locations) based on a statistical analysis of the thermal images of humans observed over a period of time.

For example, after the imaging system detects the thermal images of a number of people that have been to the monitored area (e.g., room (109)) over a period of time, the system computes a statistical distribution of the relative height of the people detected in the period of time. The mounting height can be scaled to match the distribution of the height of the detected people with a known distribution of height of people (e.g., people in the same geographical region and/or having ages within an expected range for people visiting the monitored area). A mounting height computed from the height distribution can be used in place of a mounting height computed from an input of the height of a user detected during the installation process, or to cross check and/or improve the mounting height computed during the installation process. Thus, the calibration accuracy can improve over time based on the monitoring results of the imaging system.

In some instances, an object of a known height in the monitored area (e.g., room (109)) can be detected in certain time periods of the service of the imaging system. For example, when there is a significant temperature difference between the room (109) and the environment outside the room (109), opening of the door at some time instances would allow the imaging apparatus assembly (101) to generate an image where the door opening area has a thermal image recognizable in the image coordinate system (e.g., the opening area has a temperature of the environment outside the room (109) while the wall on which the door is mounted has the temperature of the room). The height of the door can thus be determined from the thermal image of the door opening area to calibrate the mounting height of the imaging apparatus assembly (101) against a known or standard door height.

For example, after the imaging apparatus assembly (101) having an enclosure (167) illustrated in FIGS. 1-7 is placed in a monitored area (e.g. room (109)) to capture the scenery, a calibration/training process is configured to allow the thermal imaging system (e.g., as illustrated in FIG. 11) to understand the true geometric data from the captured footage, and recognize points of interests (POI) which may not be detectable in the imaging apparatus capturing band. For example, when thermal imaging in the band of infrared radiation looks at the scenery of uniform room temperature, the POIs are not detectable due to the lack of distinct temperature contrast or temperature differences.

When an enclosure (167) illustrated in FIGS. 1-7 is used, a set of configuration parameters are known (from factory configurations) without the need for measurements from the installation site. Such configuration parameters may include: image size and aspect ratio, imaging lens parameter (e.g., the Field of View), the mounting angles in a 3-dimensional space relative to some reference point/plane/coordinate system of the scenery (e.g. room (109)). The mounting height (123) can be determined using the method illustrated in FIGS. 11-13.

The mounting height can be determined using other technical solutions that use additional resources. For example two cameras can be mounted within the enclosure (167) with a known distance to each other; and through stereoscopic vision the referencing of objects can be determined. For example, a distance measurement sensor, such as time of flight (TOF) sensor, can be included in the imaging apparatus assembly (101) to measure its mounting height from the floor plane (127) automatically. For example, the installer may be instructed to measure the mounting height (123) using a measuring tape and enter the measurement via a user interface provided by the mobile device (117) configured for the calibration of the thermal imaging system.

Once the configuration parameters are known, the thermal imaging system has a mapping from the image coordinate system (139) and the room coordinate system for a true geometric understanding from the captured footage.

For example, the mobile device (117) is configured to establish a communication connection (e.g., via an access point (111) for a wireless local area network) with the imaging apparatus assembly (101) and/or the server (113) for the calibration of the imaging apparatus assembly (101) installed in the room (109). The mobile device (117) provides a user interface to instruct the user to move around within the room such that the user is fully visible in the thermal image captured by the imaging apparatus assembly (101) and instruct the user to be on the floor (127) in a standing position. Optionally, the user interface may instruct to the user to go to one or more preferred locations where the user is fully visible in the thermal image. The mobile device (117) receives a height of the user (e.g., via a user interface, or from a data source that has the height of the user).

In general, from the full thermal image (133) of the user (131) standing vertically on the floor plane (127), the system measures the size of the thermal image (133) and computes the mounting height (123) of the imaging apparatus assembly (101) to match the real world height of the user (131) as projected to the location and size of the thermal image (133) of the user (131) in the image coordinate system (139). It is not necessary to know the exact position and/or distance of the user (131) relative to the imaging apparatus assembly (101) or the edge (119) on which the imaging apparatus assembly (101) in order to compute the mounting height (123).

In some instances, the user or object (131) having a known height may be obstructed by other objects which could falsely show a different height of the user or object (131) in the image than the actual height in the thermal image (e.g., in particular in low resolution thermal infrared image). For example, a hot object or other subject of same temperature appears to be above the user or object (131) in the image produced by the imaging apparatus assembly (101), which makes the user or object (131) subject appear taller in the thermal image. By instructing the user (131) to walk around in the monitored area, the system can detect the thermal image of the user (131) in relation with the thermal images of other objects having temperatures that are significantly different from the room temperature and thus identify a preferred location to take a measure of the size of the thermal image (133) of the user (131) for the computation of the mounting height (123). In the preferred location, the thermal images of other objects do not interfere with the measure of the size of the thermal image (133) of the user (131) in the image coordinate system (139). Optionally, the user interface of the mobile application running in the mobile device (117) shows the thermal image from the imaging apparatus assembly (101) in real time, such that the user may verify that the user is standing in a location in a room where the thermal images of other objects do not overlap with the thermal image (133) of the user (131) in a way that affects the accurate measurement of the height of the thermal image (133) of the user (131) in the image coordinate system (139).

Calibration through the thermal image of a human having a known height is one example. In general, any object of known height/geometry, which can be detected by the imaging apparatus of the imaging apparatus assembly (101) can be used to as the reference object (131) in the imaging scenery, such as a cup of hot water, a bottle of iced water. Typically, the human body forms an ideal reference object in thermal infrared due to a good contest from a typical room temperature background and a size similar to the objects to be monitored in the scenery. Thus, the use of a human body as a reference offers simplicity and easiness in installation and calibration, which in fact does not require any know-how of technical expertise or any other objects/apparatuses/aids to perform this type of referencing.

Preferably, the communication connectivity between the imaging apparatus assembly (101) and a centralized remote server (113) allows the storage of the calibration information of the imaging apparatus assembly (101) installed in a monitored area (e.g., room (109)) in the cloud to facilitate cloud computing. Such an arrangement enables a very smooth user experience and friendly interface (e.g., implemented via a mobile application running in a mobile device (117)). Some of the computation and/or resource intensive tasks can be performed on the mobile device (117) and/or on the server (113). Thus, the cost of the imaging apparatus assembly (101) can be reduced.

In a typical installation process, the mobile device (117) (or an instruction manual) instructs the user to:

1. activate the imaging apparatus assembly (101) (e.g. by peeling of protection strip between battery contact and battery, or pushing a button to switch device on, supply power through cable, etc.);

2. establish a communication connection to the imaging apparatus assembly (101) (e.g., by using a mobile application installed on the mobile device (117), such as a smartphone, a tablet computer, or a personal media player, to scan a code which is placed on or associated with the imaging apparatus assembly (101) that has a unique device ID used for establishing an authorized communication connection, such as a wireless personal area network connection (e.g., Bluetooth connection or Near Field Communication connection), and by using the mobile application and the connection to the imaging apparatus assembly (101) to configure the connection to the access point (111) and the server (113) over the network (115) and configured the imaging apparatus assembly (101) in a user account);

3. optionally, enable a connection to a cloud-based computing & storage system (e.g., a connection between the imaging apparatus assembly (101) and the server (113), via internet, either standalone from imaging apparatus assembly (101) or through a low power communication connection with a hub, using Bluetooth, Zig-Bee, etc. in order to preserve energy, where the hub is connected to the internet);

4. optionally, configure the mobile device (117) to perform at least some of the functions of the server (113) in storing and/or processing the calibration information;

5. mount the imaging apparatus assembly (101) in an edge (119) or a corner (174) of a room (109), preferably at a location above a head height for a desirable coverage of the monitored area, where the enclosure (167) of the imaging apparatus assembly (101) as illustrated in FIGS. 1-9) simplifies the alignment of the imaging apparatus assembly (101) with the orientation of the room (109);

6. identify an approximate mounting height (123) of the imaging apparatus assembly (101) above the floor plane (127) of the room (109), (e.g., by instructing the user to step back until the user is fully visible and unobstructed then confirm the approximate height of the user, where the mobile application running on the mobile device (117) can provide some visual feedback of thermal images of the user captured by the imaging apparatus assembly (101));

7. optionally, configure and mount additional thermal camera assemblies (e.g., installed in adjacent or opposite corners and/or edges, for example, for improved fall detection where at least two thermal camera assemblies are mounted in adjacent corners or edges), in a way similar to the configuring of the first imaging apparatus assembly (101) in the room (109) without the needs to perform operations to identify their mounting heights, because mounting height of the subsequently added thermal camera assemblies can be computed from the height of an object captured simultaneously by the first imaging apparatus assembly (101) and the subsequently added thermal camera assembly and the real world height calculated according to the mounting height of the first imaging apparatus assembly (101), and machine learning can be applied to correlate the objects as seen by the different thermal camera assemblies installed to monitor the same room (109)); and 8. optionally, go to one or more points of interests to identify environmental features in the room (109) that may not be detectable from the thermal images of the room (109), such as the opposite corner of the room (109) to define the maximum diagonal distance of the viewing field, other corners of the room (109) to help determine the ground plane of the scenery, and the locations of doors, tables, pillars, furniture, and other objects.

For example, the mobile application may instruct the user to walk to a location and then push a button on the mobile application (or provide a voice commend to the mobile application, provide a gesture made via flipping or shaking the mobile device (117), or stand still at the location for a few seconds) to indicate that the user is standing at the location. This teaches the thermal imaging system the geometry/layout of the room (109) and the locations and/or sizes of the environmental objects in the room (109) within the thermal image coordinate system.

For example, if a room has multiple doors, the installer could simply stand in the door, confirm in the mobile application that he/she is standing in a door and chose from a set of menu options where this door leads to (e.g., closet, kitchen, entrance, toilet, living room, etc.). Such information helps the thermal imaging system to determine people traffic (e.g., for monitoring a store or office spaces to determine where people movements are, for safety and/or security applications, etc.). Such an aspect is unique for thermal imaging because the POIs that are invisible in the thermal infrared band are identified by simple user interaction with a mobile application running in the mobile device (117).

The storage of the input parameters, calibration parameters, POI mapping data, etc., can be in the cloud (e.g., the server (113)), the mobile device (117), and/or the imaging apparatus assembly (101). The server (113) and/or the mobile device (117) can be configured to use algorithms and/or look-up tables to reconstruct the geometrical relations between the thermal image coordinate system and the room coordinate system, based on the configuration parameters.

When configured as discussed above, a thermal imaging system knows the true geometric relations between the thermal imaging space and the real world space and/or the points of interest that are not visible in the thermal image system. As a result, the system can not only determine position and height of humans and objects within the field of view of the thermal camera assemblies (e.g., 101)) but can also determine how much people have moved within the scenery.

For example, by tracking individuals throughout the scenery, the system calculates how much distance the individual has walked. Such information can be used in determining whether a senior has been sufficiently active within the premises for senior living; and a cloud based system can calculate how much energy the subject has consumed/burned and aid the user by interacting with the user and letting the user know if activity is insufficient. For example, if the activity is excessive and the risk of a fall/injury due to exhaustion is probable, the system can provide an alert to the senior being monitored and/or care providers.

The configuration process discussed above can be carried out with minimum user requirements: the installer does not have to have any skills in the related arts, does not require any instruments for installation; and for the parameter determination only an interface device (e.g. a smart phone, tablet, or computer with an application or other pre-installed communication port) and a user height input are used.

In one aspect, the present application provides an imaging system which can determine automatically all configuration parameter in order to determine geometric relations of the viewing field through distance measurement sensors or multiple (known) camera configuration. If such engineering solution is not available (e.g. due to cost), a "simpler" imaging system determines the finial configuration parameter (e.g., mounting height) based on an input from the user either the mounting height or the height of the user/installer/the person performing the calibration.

In another aspect, the present application provides a method where a human is a reference (marker) for providing novel functional contextual geometric information and key points (e.g., points of interest) within a viewing field of an internet-connected thermal imaging apparatus which has the capability of computation and storage (e.g., via cloud computing) (and interact with user through a user interface) under a set of instruction without requiring the user/installer/human to have technical skills.

In a further aspect, the present application provides a cloud-based thermal imaging system which reconstructs and provides contextual information of scenery by simple configuration determination.

The wirelessly connected thermal imaging system can use a low resolution thermal footage to monitor human occupancy and activity in scenery without revealing information about person's identity. From the thermal footage, the system determines human activity and well-being.

Optionally, the imaging apparatus assembly (101) contains an audio device to provide audio signals to occupants in the monitored area (e.g., room (109)). The audio signals may include voice instructions and/or prompts streamed from the server (113). In such an embodiment, the user interface described above in connection with the mobile device (117) can be replaced or augmented with the audio-based interface. For example, the calibration/installation instructions provided by the mobile device (117) can be replaced and/or augmented with voice instructions streamed from the server (113). For example, when the user (131) is at the location where the thermal image (133) of the user (131) is fully captured by a frame of image generated by the imaging apparatus assembly (101), a voice prompt instructs the user to remain standing at the location while the system announces heights and start to walk when an announced height matches the height of the user (131). Thus, the user height can be conveniently provided to the system via a combination of voice prompts and thermal image feedback by motion or the lack of motion (and/or other gesture) that can be detected from the images generated by the imaging apparatus assembly (101).

Optionally, the imaging apparatus assembly (101) includes a microphone to receive audio inputs from the user(s) in the area monitored by the imaging apparatus assembly (101). Further, the imaging apparatus assembly (101) may include light-based indicators for user interaction. In some instances, the imaging apparatus assembly (101) uses a communication connection to a separate device that has the audio and/or visual capabilities to use the audio and/or visual capabilities to provide the user interface. For example, an existing voice-based intelligent personal assistant (e.g., in the form of an internet-connected mobile device (117)) may be installed in the room (109) and connected to the access point (111); and the imaging apparatus assembly (101) connects to the personal assistant via the access point (111) to provide the interface for voice-based interaction; and thus it is not necessary to provide the user interface via a tablet computer (117).

The audio device(s) and/or visual device(s) of the imaging apparatus assembly (101) can be used to provide various services. For example, in the case of elderly monitoring, when elderly do not hear properly, that some light indication can be triggered only based on human presence.

The imaging apparatus assembly (101) may be connected to other connected devices and/or systems, such as a landline telephone. For example, when a telephone is placed in a living room and it rings, the signal would be sent via cloud (e.g., the server (113)) to the imaging apparatus assembly (101), which knows where the user (131) is present in the house from thermal imaging and thus provides audio and/or visual indications about the event to the user (131) (e.g., light, beep, voice prompt, etc.). For example, the imaging apparatus assembly (101) may provide indications about an event from the from alarm burglar system. From toddler monitoring to elderly care, the advantage of the system includes its non-intrusive people presence knowledge and non-wearable, remote notification of events. The system can provide an attractive solution where grandma is not required to wear something/carry something on her, in order to get notified about some events occurring in the house. The system provides the notification based on the knowledge of the location of grandma and/or the activity of the grandma. The notification can be filtered and/or provided in an intelligent way based on human activities observed by the imaging apparatus assembly (101). For example, when the thermal image of grandma consistent with the grandma sleeping or watching TV, certain alarms or notifications are suppressed.

For example, the imaging system includes a camera assembly (101) having: an enclosure (167) having at least two mounting surfaces (e.g., 162, 163, and/or 164) that are orthogonal to each other for alignment with at least two orthogonal surfaces (e.g., 171, 172, and/or 173) against which the camera assembly is to be mounted; at least one imaging apparatus (e.g., an imaging apparatus (175)) disposed within the enclosure (167) and having a predetermined orientation with respect to the enclosure (167); and a communication device disposed within the enclosure (167). The imaging system further includes a server (113) disposed at a location remote from where the camera assembly (101) is mounted. The camera assembly (101) and the server (113) communicate over a computer communication network (115) to identify at least one installation measurement of the camera assembly to establish a mapping from an image coordinate system for images generated by the imaging apparatus and a real world coordinate system aligned with an orientation defined by the at least two orthogonal surfaces. The communication device may be a wireless communication device, or a wired communication device.

For example, a user (e.g., installer or owner) of the camera assembly (101) is instructed to mount the camera assembly (101) on a vertical edge (119) where two walls (171 and 172) meet; and the at least one installation measurement includes a mounting height (123) of the camera assembly (101) over a floor plane (127) on which the user (101) of the system stands.

Preferably but not required, the imaging apparatus is an imaging apparatus (175) that generates the images based on sensing infrared radiation. Preferably, a resolution of the imaging apparatus (175) is sufficiently low that an identity of the person captured in the thermal image generated by imaging apparatus (175) cannot be determined from the thermal image.

Optionally, a mobile application running in a mobile device (117) is configured to provide a user interface (e.g., as illustrated in FIG. 13), in communication with at least one of: the camera assembly (101) and the server (113), in identifying the installation measurement, such as the mounting height (123) and/or the locations of points of interest in the image coordinate system (139).

For example, the user interface is configured to receive an input identifying a height of the user (131) whose thermal image (133) is captured in an image generated by the imaging apparatus (175); and the mounting height (123) is computed from a height of the thermal image (133) of the user in the image coordinate system (139) and the real-world height of the user (131) received in the user interface.

The at least one installation measurement may include a location, in the image coordinate system, of a point of interest (e.g., a room corner, a door, or a window) in a scene, area, or space monitored by the imaging apparatus (175). The point of interest is typically within the images generated by the imaging apparatus (175) but not visible in the images generated by the thermal camera. The installation measurement can be used to construct an area layout that defines the geometry of the monitored space.

In some implementations, the imaging system includes: a second camera assembly having a known mounting height (e.g., previously determined, measured automatically using a sensor, or identifying by a user). Then, the mounting height of a first camera assembly can be computed based on the mounting height of the second camera assembly and correlation of objects simultaneously captured in images generated the first and second cameras. The mounting height of the first camera assembly can be adjusted such that the real world heights of objects observed and calculated by the first camera match with the real world heights of corresponding objects observed and calculated by the second camera.

In some instances, a camera assembly (101) includes a sensor to automatically measure a mounting height (123) between the camera assembly (101) and a floor plane (127).

For example, after attaching the camera assembly (101) to an edge (119) or corner (174) where two or three orthogonal surfaces (e.g., 171, 172, and/or 173), the user may activate the camera assembly (101) to establish a communication connection with a remote server (113) and/or a mobile device (117). The server (113) and/or the mobile device (117) can provide instructions the user to move around in the monitored area so that the user is in a location where the full height of the thermal image (133) of the user is detected in the image generated by the camera assembly (101). The user may be prompted to provide a height of the user standing on a floor (127) and captured in full by the camera assembly so that the imaging system can compute a mounting height (123) of the camera assembly (101), based on the real world height of the user (131) and a measurement of a height of the user in the image. The height of the user may be provided via a graphical user interface of the mobile device (117), or a gesture of the user detected via the camera assembly (101) in connection with voice prompts provided by the server (113).

Optionally, the user is instructed to move a thermally-detectable object (e.g., a cup of hot or cold water, or the body of the user) to a point of interest in the area (e.g., room (109)) monitored by the camera assembly (101) to allow the imaging system to bookmark the point of interest in images generated by the camera assembly (101) according to a location of a thermal image (133) of the object positioned at, or in the vicinity of, the point of interest in the monitored area of the imaging system. For example, the camera assembly (101) images based on sensing infrared radiation; and the point of interest is not visible in the images generated by the camera assembly and thus cannot be determined directly from an analysis of the images generated by the camera assembly at the time of installation.

Optionally, the imaging system identifies the locations of some points of interest from machine learning of objects identified from the thermal images over a period of time, where temperature changes in certain areas of the monitored area and/or the human activities (and/or other thermal activities) in the monitored area provide indications of the locations of the points of interests. In such an implementation, it is not necessary to provide a user interface for the calibration, calculation, and/or the identification of configuration parameters, such as the mounting height, the location of points of interests, etc. For example, the user may attach the imaging apparatus assembly (101) and walks away; and the imaging system captures height of reference object and approximates after time possible height range statistically. Such the interaction of the imaging system with a user is optional; and the system performs the calibration in the background based on statistical analysis and/or "machine learning" of object identification from the result of a large number units of camera assemblies installed in various locations and settings. Statistical results of objects and/or environments as observed by the camera assemblies and/or look up tables can be used to train the imaging system to automatically calculate the mounting heights and points of interests as recognized from the recorded images from the camera assemblies.

In some instances, user inputs are provided to the imaging system via correlation of a known context (e.g., a user is instructed to go to a point of interest) and the thermal images of the objects observed by the imaging apparatus assembly (101) (e.g., the location of a thermal image (133) of the user (131)). User inputs can also be provided through the mobile device (117) by pushing a button in a user interface, a voice command to a user interface implemented on the mobile device (117), or a gesture input using the mobile device (117). Inputs can also be made via thermal gesture detectable by the imaging apparatus assembly (101), e.g., by moving the object and then keeping the object still for at least a predetermined period of time.

Examples of the points of interest include: a corner of a room in which the camera assembly is installed; a door of the room; a window of the room; a furniture located in the room; a pathway in the room; and an activity area in the room.

After the thermal image system is calibrated or configured with a set of configuration parameters to map between: an image coordinate system of images generated by the camera assembly (101); and a real world coordinate system of the area monitored by the camera assembly (101), the thermal image system can provide valuable services.

For example, the thermal imaging system identifies sizes and orientations of objects visible in the images generated by the camera, based on sizes and orientation of the objects as measured in the images generated by the camera and the set of configuration parameters.

For example, the thermal imaging system generates monitoring alerts provided via an output device of the camera assembly in reference to the points of interest in the area, when the set of configuration parameters further identifies points of interest in the area in the image coordinate system (e.g., points of interest having locations in the images generated by the camera assembly but not visible in such images).

In some instances, the thermal image system can improve the set of configuration parameters through statistical analysis and/or machine learning. For example, the accuracy of the mounting height (123) of the camera assembly (101) above a floor plane (127) of the monitored area can be improved based on matching a statistical distribution of heights of thermal images of humans observed by the imaging apparatus assembly (101) over a period of time with a known distribution.

Further calibration techniques of a thermal imaging system can be found in U.S. patent application Ser. No. 15/607,345, filed May 26, 2017 and entitled "Apparatus and Method of Location Determination in a Thermal Imaging System", the disclosure of which is hereby incorporated herein by reference.

Each of the mobile device (117), the server system (113), and the imaging apparatus assembly (101) can be implemented at least in part in the form of one or more data processing systems illustrated in FIG. 14, with more or fewer components.

The present disclosure includes the methods discussed above, computing apparatuses configured to perform methods, and computer storage media storing instructions which when executed on the computing apparatuses causes the computing apparatuses to perform the methods.

FIG. 14 shows a data processing system that can be used to implement some components of embodiments of the present application. While FIG. 14 illustrates various components of a computer system, it is not intended to represent any particular architecture or manner of interconnecting the components. Other systems that have fewer or more components than those shown in FIG. 14 can also be used.

In FIG. 14, the data processing system (200) includes an inter-connect (201) (e.g., bus and system core logic), which interconnects a microprocessor(s) (203) and memory (211). The microprocessor (203) is coupled to cache memory (209) in the example of FIG. 14.

In FIG. 14, the inter-connect (201) interconnects the microprocessor(s) (203) and the memory (211) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. When the data processing system is a server system, some of the I/O devices (205), such as printers, scanners, mice, and/or keyboards, are optional.

The inter-connect (201) includes one or more buses connected to one another through various bridges, controllers and/or adapters. For example, the I/O controllers (207) include a USB (Universal Serial Bus) adapter for controlling USB peripherals, and/or an IEEE-1394 bus adapter for controlling IEEE-1394 peripherals.

The memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An assembly, comprising:
an enclosure having a base face transparent to infrared radiation and two mounting faces configured to be overlaid respectively on a surface of a first wall of a room and a second wall or ceiling of the room, wherein each respective mounting face in the mounting faces has an attachment element fixedly connected to the respective mounting face and configured to secure overlaying of the respective mounting face on to a respective wall or ceiling of the room; and
a thermal imaging apparatus within the enclosure with a predetermined orientation relative to the base face to have a designed imaging direction with respect to the room when the enclosure is mounted in the room.

2. The assembly of claim 1, wherein the attachment element comprises one of a mounting bracket or jig.

3. The assembly of claim 1, wherein when the enclosure is mounted such that the base face of the enclosure facing a predetermined portion of the room and the thermal imaging apparatus is configured to capture thermal images of the predetermined portion of the room through the base face of the enclosure.

4. The assembly of claim 3, wherein the mounting faces are between 85 and 95 degrees with respect to each other.

5. The assembly of claim 3, wherein the thermal imaging apparatus has a resolution lower than required to determine an identity of a person in the room imaged by the imaging apparatus.

6. The assembly of claim 5, wherein the thermal imaging apparatus has a frame rate less than nine frames per second.

7. The assembly of claim 6, wherein the thermal imaging apparatus has a frame rate of one frame per second.

8. The assembly of claim 7, further comprising: a wireless transmitter to communicate the thermal images captured by the imaging apparatus to a separate device for processing.

9. The assembly of claim 8, wherein the wireless transmitter transmits wireless signals using a protocol for one of: a wireless local area network; a personal area network; a radio transmission link; and a cellular communication network.

10. The assembly of claim 8, wherein the thermal imaging apparatus and the wireless transmitter are battery powered; and the thermal imaging apparatus has no cable connecting from inside of the enclosure to outside of the enclosure.

11. The assembly of claim 10, wherein at least one of the mounting faces of the enclosure has an orientation marker; and at least one of the mounting faces of the enclosure has an attachment element for securing to one of: the surface of the first wall or the surface of the second wall or, ceiling.

12. An assembly comprising:
an enclosure having a face transparent to infrared radiation and two mounting faces configured to be overlaid respectively on a surface of a first wall of a room and a second wall or ceiling of the room, wherein each respective mounting face in the mounting faces has an attachment element fixedly connected to the respective mounting face and configured to secure overlaying of the respective mounting face on a respective wall or ceiling of the room; and
a thermal imaging apparatus within the enclosure with a predetermined orientation relative to the face to have a designed imaging direction with respect to the room when the enclosure is mounted in the room.

13. The assembly of claim 12, wherein the attachment element comprises one of a mounting bracket or jig.

14. The assembly of claim 12, wherein the thermal imaging apparatus has a frame rate between one and nine frames per second.

15. The assembly of claim 12, further comprising: a wireless transmitter to communicate the thermal images captured by the imaging apparatus to a separate device for processing.

16. The assembly of claim 15, wherein the wireless transmitter transmits wireless signals using a protocol for one of: a wireless local area network; a personal area network; a radio transmission link; and a cellular communication network.

17. An enclosure of an assembly for imaging, the enclosure comprising:
no more than four external faces, including:
one base face which is opaque from a field of view that is outside of the enclosure and at least two mounting faces configured to be overlaid respectively on a surface of a first wall of a room and a second wall or ceiling of the room, wherein each respective mounting face in the mounting faces has an attachment element fixedly connected to the respective mounting face and configured to secure overlaying of the respective mounting face on to a respective wall or ceiling of the room; and
wherein the enclosure is configured to house at least one thermal imaging apparatus, the imaging apparatus mounted predetermined orientation relative to the base face to have a designed imaging direction with respect to the room when the enclosure is mounted in the room.

18. The enclosure of claim 17, wherein the enclosure has a shape of one of: a tetrahedron; one eighth of a ball; and a quarter of a ball.

19. The enclosure of claim 17, wherein the base face is a curved surface; and except the base face, the no more than four external faces are flat faces orthogonal to each other.

20. The enclosure of claim 17, wherein the enclosure has no opening for cable connections.

21. The assembly of claim 1, wherein the enclosure is attachable to the first wall and the second wall or ceiling without removal of the attachment element from each respective mounting face.

22. The assembly of claim 1, wherein the attachment element is pre-installed on the enclosure prior to installation of the assembly by attachment of the mounting faces to the first wall and the second wall or ceiling.

* * * * *